US010063585B2

(12) United States Patent
Salajegheh et al.

(10) Patent No.: US 10,063,585 B2
(45) Date of Patent: Aug. 28, 2018

(54) METHODS AND SYSTEMS FOR AUTOMATED ANONYMOUS CROWDSOURCING OF CHARACTERIZED DEVICE BEHAVIORS

(71) Applicant: QUALCOMM Incorporated, San Diego, CA (US)

(72) Inventors: Mastooreh Salajegheh, San Jose, CA (US); Mona Mahmoudi, Sunnyvale, CA (US); Vinay Sridhara, Santa Clara, CA (US); Mihai Christodorescu, San Jose, CA (US); Gheorghe Calin Cascaval, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/661,195

(22) Filed: Mar. 18, 2015

(65) Prior Publication Data

US 2016/0277435 A1 Sep. 22, 2016

(51) Int. Cl.
*H04L 29/06* (2006.01)
*G06F 9/46* (2006.01)
(Continued)

(52) U.S. Cl.
CPC .......... *H04L 63/1441* (2013.01); *G06F 9/46* (2013.01); *G06F 11/3409* (2013.01);
(Continued)

(58) Field of Classification Search
CPC .......... H04L 63/1416; H04L 63/1441; H04L 63/0421; H04L 63/1425; G06F 9/46;
(Continued)

(56) References Cited

U.S. PATENT DOCUMENTS

2009/0248496 A1* 10/2009 Hueter ................... G06Q 10/00
705/7.29
2011/0047597 A1* 2/2011 Mahaffey .............. G06F 21/564
726/3
(Continued)

FOREIGN PATENT DOCUMENTS

WO 2014138115 A1 9/2014

OTHER PUBLICATIONS

International Search Report and Written Opinion—PCT/US2016/018669—ISA/EPO—dated Apr. 26, 2016.
(Continued)

*Primary Examiner* — Amir Mehrmanesh
(74) *Attorney, Agent, or Firm* — The Marbury Law Group, PLLC

(57) ABSTRACT

Methods, and devices implementing the methods, use device-specific classifiers in a privacy-preserving behavioral monitoring and analysis system for crowd-sourcing of device behaviors. Diverse devices having varying degrees of "smart" capabilities may monitor operational behaviors. Gathered operational behavior information may be transmitted to a nearby device having greater processing capabilities than a respective collecting device, or may be transmitted directly to an "always on" device. The behavior information may be used to generate behavior vectors, which may be analyzed for anomalies. Vectors containing anomaly flags may be anonymized to remove any user-identifying information and subsequently transmitted to a remote recipient such as a service provider or device manufacture. In this manner, operational behavior information may be gathered about different devices from a large number of users, to obtain statistical analysis of operational behavior for specific makes and models of devices, without divulging personal information about device users.

25 Claims, 11 Drawing Sheets

(51) Int. Cl.
*G06F 11/34* (2006.01)
*G06F 21/55* (2013.01)
*G06F 21/62* (2013.01)
*H04W 12/12* (2009.01)
*H04W 24/10* (2009.01)
*H04W 12/02* (2009.01)

(52) U.S. Cl.
CPC ........ *G06F 21/552* (2013.01); *G06F 21/6254* (2013.01); *H04L 63/0421* (2013.01); *H04L 63/1416* (2013.01); *H04L 63/1425* (2013.01); *H04W 12/02* (2013.01); *H04W 12/12* (2013.01); *H04W 24/10* (2013.01)

(58) Field of Classification Search
CPC .............. G06F 11/3409; G06F 21/552; G06F 21/6254; H04W 24/02; H04W 24/00
See application file for complete search history.

(56) References Cited

U.S. PATENT DOCUMENTS

| | | | |
|---|---|---|---|
| 2011/0145920 A1* | 6/2011 | Mahaffey | G06F 21/564 726/22 |
| 2011/0252476 A1 | 10/2011 | Loveland et al. | |
| 2012/0110174 A1* | 5/2012 | Wootton | G06F 21/564 709/224 |
| 2013/0066818 A1 | 3/2013 | Assadollahi et al. | |
| 2013/0103651 A1* | 4/2013 | Jha | G06F 17/30097 707/687 |
| 2013/0303159 A1 | 11/2013 | Gathala et al. | |
| 2014/0053261 A1 | 2/2014 | Gupta et al. | |
| 2014/0196139 A1* | 7/2014 | Ferdinand | H04L 63/083 726/9 |
| 2014/0287723 A1 | 9/2014 | Lafever et al. | |
| 2014/0337862 A1 | 11/2014 | Valencia et al. | |
| 2014/0359552 A1 | 12/2014 | Misra et al. | |

OTHER PUBLICATIONS

Schmidt A D., et al., "Monitoring Smartphones for Anomaly Detection", Mobile Networks and Applications, vol. 14, No. 1, Nov. 11, 2011 (Nov. 11, 2011), pp. 92-106, XP058022407, ISSN: 1383-469X, DOI:10.1007/S11036-008-0113-X pp. 92-93.

Schmidt A.D., et al., "Static analysis of executables for collaborative malware detection on android", Proceedings of the 2009 IEEE International Conference on Communications (ICC'09), Jun. 14, 2009 (Jun. 14, 2009), 3 Pages, XP031506460, DOI: 10.1109/ICC.2009.5199486 the whole document.

* cited by examiner

METHODS AND SYSTEMS FOR AUTOMATED ANONYMOUS CROWDSOURCING OF CHARACTERIZED DEVICE BEHAVIORS

BACKGROUND

Explosive growth in communication technologies over the past several years has lead to the advent of the "Internet of Things," connecting devices as smart objects in the home, office, or other facilities. This growth has been fueled by better communications, hardware, larger networks, and more reliable protocols. As a result, communications service providers are now able to offer their customers unprecedented levels of access to information, resources, and communications.

To keep pace with these service enhancements, electronic devices (e.g., cellular phones, tablets, laptops, televisions, refrigerators, smart bulbs, etc.) have become more powerful and complex than ever. This complexity has created new opportunities for software conflicts, hardware faults, trialware, and other similar errors or phenomena to negatively impact a device's long-term and continued performance and power utilization levels, as well as the end user experience. As a result, identifying and correcting the conditions and/or device behaviors that may negatively impact each device's long term and continued performance and power utilization levels is beneficial to consumers.

Collection and aggregation of information about device conditions and behaviors by service providers and manufacturers may enable faster identification and correction of malicious behaviors and performance degrading conditions. Behavior information may be gathered for many types of "Internet of Things" devices and passed to service providers and manufacturers, who may analyze the data for long-term device behavior trends, errors, malfunctions, etc. In this manner, service providers and manufacturers may gain useful information about the operation and function of devices subject to diverse operational conditions. However, gathering such information has the potential to reveal sensitive personal information to service providers and manufacturers.

SUMMARY

The methods and apparatuses of various aspects provide circuits and methods for automated anonymous crowdsourcing of characterized device behaviors. Aspect methods may include anonymizing, by a processor of a first device, a device behavior vector to remove user-identifying information in response to detecting anomalous behavior, and transmitting, by a transceiver of the first device, the device anonymized device behavior vector over a network to a remote server.

Some aspects may include monitoring, by the processor of the first device, the behavior of a device over a period of time by collecting behavior information from device components, building, by the processor of the first device, a device behavior vector using the collected behavior information of the device, and analyzing, by the processor of the first device, the device behavior vector to detect anomalous behavior.

Some aspects may include monitoring, by a processor of a second device, the behavior of the second device over a period of time by collecting behavior information from device components, transmitting, by a transmitter of the second device, the collected behavior information to the first device; building, by the processor of the first device, a device behavior vector using the collected behavior information of the second device, and analyzing, by the processor of the first device, the device behavior vector to detect anomalous behavior.

Some aspects may include monitoring, by a processor of a second device, the behavior of the second device over a period of time by collecting behavior information from device components, transmitting, by a transmitter of the second device, the collected behavior information to a third device, building, by a processor of the third device, a device behavior vector using the collected behavior information received from the second device, transmitting, by a transceiver of the third device, the device behavior vector to the first device, and analyzing, by the processor of the first device, the device behavior vector to detect anomalous behavior. Such aspects may further include monitoring, by the processor of a third device, behavior of the third device over a period of time by collecting behavior information from device components, building, by the processor of the third device, a third device behavior vector using the collected behavior information of the third device, transmitting, by a transceiver of the third device, the third device behavior vector to the first device, and analyzing, by the processor of the first device, the third device behavior vector to detect anomalous behavior.

Some aspects may include monitoring, by a processor of a second device, the behavior of the second device over a period of time by collecting behavior information from device components, transmitting, by a transmitter of the second device, the collected behavior information to a third device, building, by the processor of the third device, a device behavior vector using the collected behavior information received from the second device, analyzing, by the processor of the third device, the device behavior vector to detect anomalous behavior, and transmitting, by a transceiver of the third device, the device behavior vector to the first device in response to detecting anomalous behavior. Such aspects may further include monitoring, by the processor of a third device, behavior of the third device over a period of time by collecting behavior information from device components, building, by the processor of the third device, a third device behavior vector using the collected behavior information of the third device, analyzing, by the processor of the third device, the third device behavior vector to detect anomalous behavior, and transmitting, by a transceiver of the third device, the third device behavior vector to the first device in response to detecting anomalous behavior.

Some aspects may include generating, by the processor of the first device, a feature vector in response to detecting anomalous behavior, wherein the feature vector is associated with a detected anomalous behavior, transmitting, by the processor of the first device, the feature vector to one or more devices in local communication with a first device, and monitoring, by processors of the one or more devices, behavior related to a feature contained in the feature vector.

Some aspects may include receiving, by the transceiver of the first device, from a remote server, one or more feature vectors related to one or more devices in local communication with a first device, transmitting, by the processor of the first device, the one or more feature vectors to the one or more devices in local communication with the first device, and monitoring, by processors of the one or more devices, behavior related to a features contained in the one or more feature vector.

In some aspects, anonymizing the device behavior vector may include applying to the device behavior vector an anonymizer model that is unique to the device.

Aspects include a multi-technology communication device having an antenna and a processor communicatively connected to the antenna and configured with processor-executable instructions to perform operations of one or more of the aspect methods described above.

Aspects include a multi-technology communication device having means for performing functions of one or more of the aspect methods described above.

Aspects include a non-transitory processor-readable medium having stored thereon processor-executable software instructions to cause a processor to perform operations of one or more of the aspect methods described above Aspects may include a communication system of multiple devices configured with processor-executable instructions to perform operations of one or more of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1A:
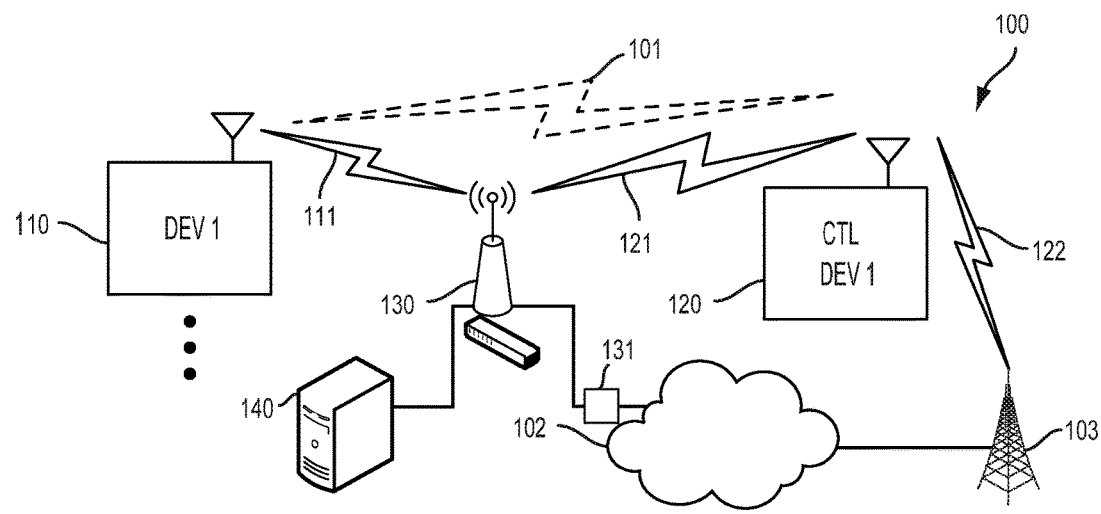
FIGS. 1A-C are communication system block diagrams illustrating network components of an example smart device system and associated networking framework that are suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and smart devices configured to implement the methods, of crowd-sourcing device behavior information in a privacy-preserving manner. For ease of reference, the term "device-specific classifier models" is used herein and in the claims to refer to either or both of device-specific and feature-type specific classifier models as described below.

The word "exemplary" is used herein to mean "serving as an example, instance, or illustration." Any implementation described herein as "exemplary" is not necessarily to be construed as preferred or advantageous over other implementations.

As used herein, the terms "smart device" or "device" may refer to any one or all of smart appliances (coffee makers, refrigerators, thermostats, blind controls, ovens, washers/dryers, etc.), smart lightbulbs, smart speakers, smart personal devices, smart multi-media players, television set top boxes, integrated digital smart televisions, cable television receivers, and similar personal electronic smart devices, as well as computing devices, such as smartphones, laptop computers, tablet computers, palm-top computers, and personal computers, which include a programmable processor and memory and circuitry exchanging information via a wireless network (e.g., WiFi, Bluetooth (BT), BTLE, etc.). Reference to "smart" in connection with these smart devices may refer to the capability to communicate the device status and control and operate the device remotely through a communication network or networking framework.

The term "networking framework" as used herein may refer interchangeably to a communications framework, an applications framework, and organized systems of communication and application-interaction protocols and commands for facilitating device-to-device (e.g., peer-to-peer or "P2P") and application-to-application communications and interactions. A networking framework may be implemented as a collection of Application Programming Interfaces (APIs), Software Development Kits (SDKs), and other application or system software that collectively provide standard mechanisms and interface definitions to enable interfacing between controlling and controlled smart devices coupled through a communication network that may be an ad hoc network. The various APIs and SDKs may provide high level access (e.g., from an application layer) to functions that would normally be accessed or controlled at a lower layer in a software architecture. Such functions may include, but are not limited to, ad hoc networking, security, pairing, device discovery, service discovery, platform transparency, radio access control, message formatting, message transmission, message reception and decoding, and so on. Some examples of organizations providing support for peer-to-peer interactivity include the Digital Living Network Alliance (DLNA®), Universal Plug and Play (UPnP) Alliance, and Bonjour. However, these technologies are generally device-centric and tend to operate at the lower layers within software architecture (e.g., at the IP transport layer). An example of a comprehensive networking framework is the AllJoyn™ Core Framework initially developed by Qualcomm Innovation Center and hosted by the Allseen Alliance.

The AllJoyn Core Framework includes a set of service frameworks that are simple and enable users to interact with nearby device. An example of a set of service frameworks may include: Device Information and Configuration—the device broadcasts information such as device type, manufacturer and serial numbers; also allows the user to assign a name and password to the device; Onboarding—allows devices to be easily connected (e.g., via an intermediary such as an access point) to the user's network; Notifications—devices may broadcast and receive basic communications (e.g., text, image/video, audio, control, status); Control Panel—a control smart device such as a smartphone or tablet may control another device via a graphical interface (e.g., GUI or UI); Audio—audio source devices may stream to selected AllJoyn-enabled speakers, audio receivers and other audio playback smart devices.

The various aspects provide methods for facilitating crowd-sourcing of smart device behavior information in a user privacy-preserving manner for the use of error reporting, malfunction monitoring, and device performance analysis. The various aspects enable the collection of behavior information from smart devices, which may have varying degrees of "smart" capabilities. Collected information may be analyzed by the collecting smart device or by a nearby smart device with greater processing capabilities than the collector. The collected behavior information may be analyzed for device behavior or function anomalies. If anomalies are detected, the analyzing smart device may anonymize the collected behavior information, removing any user-identifying information, and transmit the anonymized behavior information to a remote party for aggregation or further analysis. This may enable manufacturers, service providers, entities engaged in device safety studies/surveys, etc. to have access to the anonymized device-specific data obtained from numerous sources without receiving any personal information from the owners of the devices.

Generally, the performance and power efficiency of a smart device may degrade over time. Similarly, smart devices may suffer numerous errors in execution or operational malfunctions throughout their lifetime. Currently, various solutions exist for modeling the behavior of operations and functions of a computing device, and these solutions may be used along with machine learning techniques to determine whether a computing device behavior is malicious or benign. However, these solutions are not suitable for use on smart devices of varying degrees of processing capabilities, because they require evaluating a very large corpus of behavior information, and/or require the execution of computationally-intensive processes in the smart device. Further, these solutions are not-privacy preserving because they do not anonymize behavior information prior to sending it to remote providers, nor do they allow for behavior information analysis on a smart device prior to transmission. As such, implementing or performing these existing solutions in a smart device network may have a significant negative and/or user-perceivable impact on the responsiveness, performance, or power consumption characteristics of the smart devices within the network.

Modern smart devices vary greatly in degree of processing capabilities as well as functionality and device behaviors. As such, the features that are most important for determining whether a particular smart device behavior is benign or not benign (e.g., anomalous, malicious or performance-degrading) may vary widely among different types of smart devices. Further, a different combination of features may require monitoring and/or analysis in each smart device in order for that smart device to quickly and efficiently determine whether a particular behavior is benign or not benign. The precise combination of features that require monitoring and analysis, and the relative priority or importance of each feature or feature combination, often may only be determined using device-specific information obtained from the specific smart device in which the behavior is to be monitored or analyzed. For these and other reasons, behavior models generated in any computing device other than the specific device in which they are used may not include information that identifies the precise combination of features that are most important to classifying a software application or smart device behavior in that device.

The various aspects include a comprehensive behavioral monitoring and analysis, and anonymization system for intelligently and efficiently identifying, conditions, factors, and/or smart device behaviors that may degrade a smart device's performance and/or power utilization levels over time or when attacked. In an aspect, an observer process, daemon, module, or sub-system (herein collectively referred to as a "module") of a smart device may instrument or coordinate various application programming interfaces (APIs), registers, counters or other smart device components (herein collectively "instrumented components") at various levels of the smart device system. The observer module may continuously (or near continuously) monitor smart device behaviors by collecting behavior information from the instrumented component. The smart device may also include an analyzer module, and the observer module may communicate (e.g., via a memory write operation, function call, etc.) the collected behavior information to the analyzer module. The analyzer module may receive and use the behavior information to generate feature or behavior vectors, generate spatial and/or temporal correlations based on the feature/behavior vectors, and use this information to determine whether a particular smart device behavior, condition, sub-system, software application, or process is anomalous, benign, or not benign (i.e., malicious or performance-degrading). The smart device may then use the results of this analysis to heal, cure, isolate, or otherwise fix or respond to identified problems.

In various aspects, the smart device may be configured to receive behavior information from other smart devices. In particular, limited capability smart devices (e.g. smart light bulbs, toasters, household appliances, etc.) may lack the processing capabilities to generate behavior vectors associated with their own monitored behavior and may transmit (e.g., via a wireless data link) collected information directly to a smart device having a full range of processing capabilities (e.g., a router) or an intermediary smart device ("observer device"), which may be configured to execute some of the functionality of the primary smart device. Observer devices may transmit behavior data received from other devices, as well as their own collected behavior information, to the primary smart device(s) for analysis and anonymization. Thus, the analyzer module may generate and analyze behavior vectors for its own behaviors, as well as for many other local smart devices.

The analyzer module may also be configured to perform real-time behavior analysis operations, which may include performing, executing, and/or applying data, algorithms, classifiers or models (herein collectively referred to as "classifier models") to the collected behavior information to determine whether a device behavior is anomalous, benign, or not benign (e.g., malicious or performance-degrading). Each classifier model may be a behavior model that includes data and/or information structures (e.g., feature vectors, behavior vectors, component lists, etc.) that may be used by a smart device processor to evaluate a specific feature or aspect of a smart device's behavior. Each classifier model may also include decision criteria for monitoring a number of features, factors, data points, entries, APIs, states, conditions, behaviors, applications, processes, operations, components, etc. (herein collectively "features") in the smart device. The classifier models may be preinstalled on the smart device, downloaded or received from a network server, generated in the smart device, or any combination thereof. The classifier models may be generated by using crowd sourcing solutions, behavior modeling techniques, machine learning algorithms, etc.

In various aspects, the anonymizer module may accept behavior vectors flagged as containing anomalous elements. These behavior vectors may be "scrubbed" the processor executing the anonymizer module to remove any user-identifying information, leaving only necessary information in the behavior vector, such as device make, model, error behavior, and date of error. This anonymized behavior vector may be transmitted over a communications network such as the Internet to one or more remote providers (e.g., manufacturers, safety study administrators, service providers, etc.). The anonymized behavior vectors may be only a few bits in size, thereby reducing the amount of data transferred off device, conserving bandwidth resources, reducing network chatter, and conserving power resources.

The various aspects include smart devices and network servers configured to work in conjunction with one another to intelligently identify the features, factors, and data points that are most relevant to determining whether a smart device behavior is anomalous, benign or not benign (e.g., malicious or performance-degrading). In various aspects, the smart device (or primary smart device) may generate feature-targeting classifier models locally in the smart device accounting for device-specific features and/or device-state-specific features, the various aspects allow the smart device processor to apply focused classifier models to quickly and efficiently identify, analyze, or classify a complex smart device behavior (e.g., via the observer and analyzer modules, etc.) without causing a significant negative or user-perceivable change in the responsiveness, performance, or power consumption characteristics of the smart device. Feature-targeting classifier models may be generated in response to determining that a device behavior is anomalous. For example, upon determining that a smart light bulb has been overheating, a primary smart device may update the smart light bulb classifier model, or generate a second model targeting the feature of operating temperature, in order to better identify instances of excess operating temperature.

In various aspects, the smart device may use behavior modeling and machine learning techniques to intelligently and dynamically generate the feature-targeting classifier models so that they account for device-specific and/or device-state-specific features of the smart device (e.g., features relevant to the smart device configuration, functionality, connected/included hardware, etc.), include, test or evaluate a focused and targeted subset of the features that are determined to be important for identifying a cause or source of the smart device's error, malfunction, degradation over time, and/or prioritize the targeted subset of features based on probability or confidence values identifying their relative importance for successfully classifying a behavior in the specific smart device in which they are used/evaluated. In some aspects, there may be a different classifier model for each smart device within the local smart device network. Those devices with sufficient processing power to perform their own analysis may maintain their device-specific classifier models in local storage, while limited capability devices may rely on observer or primary smart devices for classifier model maintenance and analysis.

In various aspects, the smart device may be configured to use the one or more classifier models to perform real-time behavior monitoring and analysis operations. For example, the smart device may use a classifier model to classify the behavior of the smart device operations by collecting behavior information from the smart device, using the collected behavior information to generate a behavior vector, applying the generated behavior vector to an associated classifier model to evaluate each test condition included in the classifier model, anonymizing the behavior vector in response to detecting an anomalous behavior, and transmitting the anonymized data to a remote location. The smart device may also analyze, anonymize, and transmit the behavior information of limited capability and observer type smart devices. In this manner, the anonymous crowd-sourcing of device behavior information may be applied to smart device networks.

The various aspects may be implemented within a variety of communication systems, such as the example communication system 100 illustrated in FIG. 1A. In an aspect, a communication system 100 may include a control smart device 120, such as a smart communication device (e.g., smartphone, tablet, etc.) or router. The control smart device 120 may control one or more smart devices 110 (e.g., smart devices) through links 111, 121 established with an access point 130 (e.g., wireless access point, wireless router, etc.). The links 111, 121 may be wireless, or may be wired such as in an Ethernet connection or a power line communication (PLC) connection, or other wired connection. In an alternative aspect or aspects, the control smart device 120 may connect directly with the smart device 110 through a direct link 101. Further in an alternative aspect or aspects, the smart devices 110 may connect with each other, either through a direct link (e.g., link 110) or through a link provided through the access point 130. The access point 130 may be connected to the Internet 102 through a service provider 131. In aspects, a local network server 140 may be present in the network and may be incorporated into a networking framework.

In various further alternative aspects, the control smart device 120 may connect to the network through a cellular infrastructure 103, which may refer collectively to cellular infrastructure components for providing cellular service. The cellular infrastructure 103 may include a component or series of components, which may include some or all of as a cellular antenna, base station (e.g., eNodeB), and so on. The control smart device 120 may connect to the access point 130 through a connection provided by the cellular infrastructure 103 through a public network such as the Internet 102, or a private network based on a Universal Resource Locator (URL) associated with the access point 130. For security reasons, access to the network through the access point 130 may be password protected, may use encryption, may use other security measures or may use a combination of security provisions. As will be described in greater detail, a networking framework may provide APIs to implement security at the application layer. By providing a security API, the details of the specific hardware for control smart devices and smart devices may be handled within the networking framework without the need to understand detailed platform-specific implementations.

The communication system 100 may further include network servers 140 connected to the telephone network and to the Internet 102. The connection between the network servers 140 and the telephone network may be through the Internet 102 or through a private network. A network server 140 may also be implemented as a server within the network infrastructure of a cloud service provider network. Communication between the network server 140 and the smart devices 110 may be achieved through wireless data networks, the telephone network, the Internet 102, a private network (not illustrated), or any combination thereof.

The network server 140 may be configured to receive information on various conditions, features, behaviors, and corrective actions from a central database or cloud service provider network, and use this information to generate data, algorithms, classifiers, or behavior models (herein collectively "classifier models") that include data and/or information structures (e.g., feature vectors, behavior vectors, component lists, etc.) that may be used by a processor of a smart computing device to evaluate a specific aspect of the computing device's behavior.

In an aspect, the network server 140 may be configured to generate a classifier model. The full classifier model may be a robust data model that is generated as a function of a large training dataset, which may include thousands of features and billions of entries. In an aspect, the network server 116 may be configured to generate the full classifier model to include all or most of the features, data points, and/or factors that could contribute to the degradation of any of a number of different makes, models, and configurations of smart devices 110. In various aspects, the network server may be configured to generate the full classifier model to describe or express a large corpus of behavior information as a finite state machine, decision nodes, decision trees, or in any information structure that can be modified, culled, augmented, or otherwise used to quickly and efficiently generate leaner classifier models.

In addition, the smart device 110 may be configured to receive one or more classifier models from the network server 140. The smart devices may be further configured to use the classifier models to analyze specific features and functionalities of the smart devices 110. The smart device may be configured to use collected behavior information to generate behavior vectors and analyze such vectors by comparing the vectors against the obtained classifier models. Thus, any differentiations detected during comparison may be deemed to be anomalous and may then be classified as benign, or not benign (e.g., malicious or degrading). Anomalous behavior vectors may be anonymized to remove information that might be personal to device users, and is then transmitted to remote servers for aggregation and further analysis.

Figure 1B:
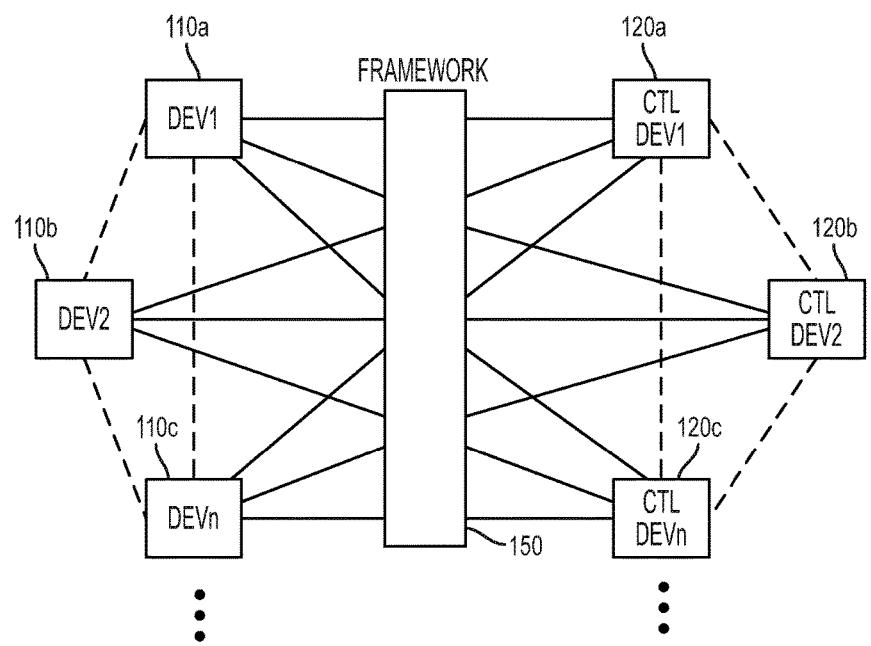

In the various aspects, control smart device and smart device interconnections may be established through a networking framework 150 as illustrated in FIG. 1B. One or more smart devices such as a DEV 1 110*a*, a DEV 2 110*b*, a DEV n 110*c*, may be coupled to one or more control smart devices such as a CTL DEV 1 120*a*, a CTL DEV 2 120*b*, and a CTL DEV n 120*c*. In FIG. 1B, the solid lines illustrate that all smart devices may be connected to each other through the networking framework 150. Interconnection through the networking framework 150 may require that smart devices be registered with the networking framework as will be described in greater detail hereinafter. In various aspects, the dotted lines illustrate that at least some of the smart devices may be connected directly with each other. Direct connections may be compatible with the networking framework 150 as ad hoc connections may be established with smart devices that are not capable of accessing the networking framework 150 directly, such as through an access point. In such examples, one smart device may provide another smart device with access to the networking framework through a direct connection between the smart devices, provided that at least one of the smart devices has access to a network connection. Network access is important to allow smart devices to be controlled by control smart devices.

Figure 1C:
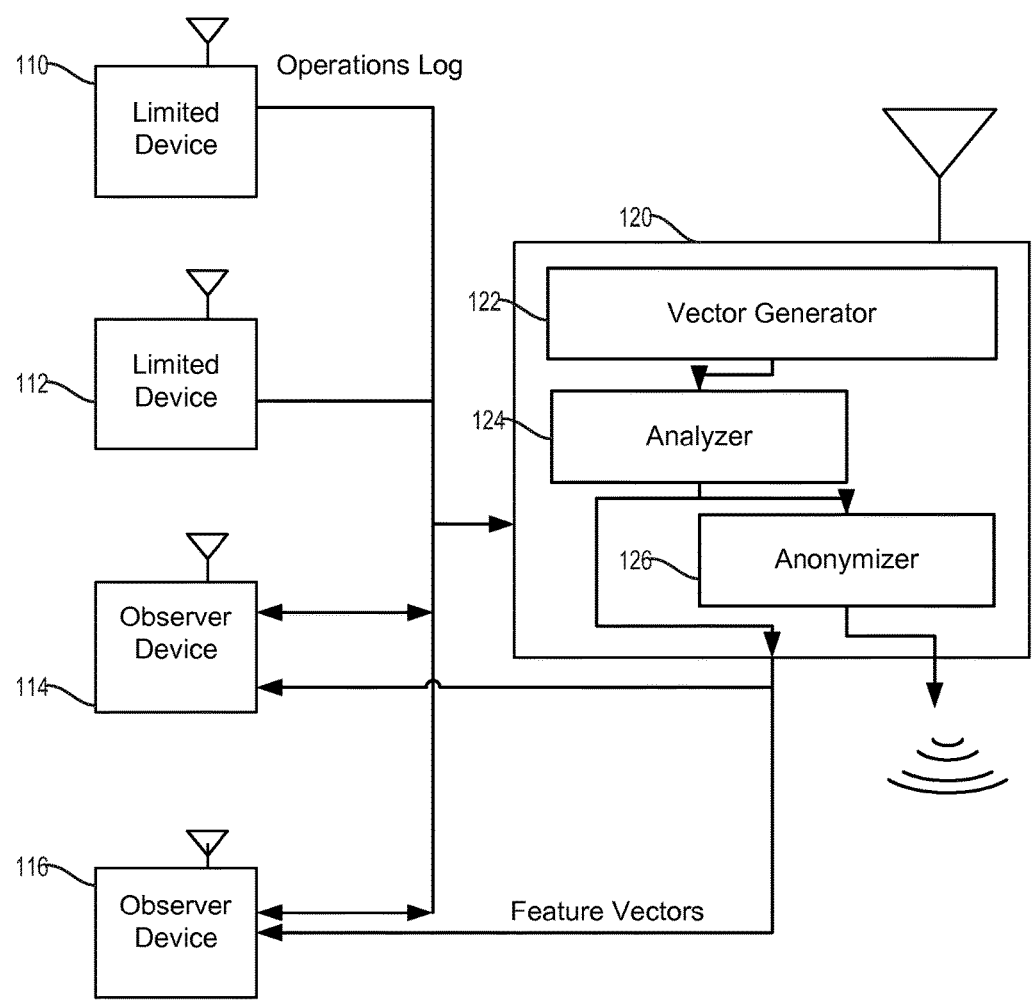

In the various aspects, control smart device and smart device interconnections may be established as illustrated in FIG. 1C. In an aspect, a control or primary smart device 120 may be any device having a full range of processing capabilities sufficient to monitor smart device behavior, generate behavior vectors from collected behavior information, analyze the generated behavior vector, anonymize the behavior vector, transmit the anonymized behavior vector, and receive/update classifier models to include new feature priorities. Examples of control smart devices 120 include but are not limited to routers, tablets, home servers, and other devices that are generally powered on throughout the day and evening.

Control smart devices 120 may receive behavior information from limited capability smart devices 112, 114 ("limited devices"), which may have the ability to monitor device behavior and transmit collected information to another smart device, but may lack the processing capabilities to generate, analyze and anonymize behavior vectors. For example, limited devices may include household appliances such as smart light bulbs (FIG. 10), toasters, thermostats, smoke alarms, etc.

Intermediate or observer smart devices 116, 118 ("observer devices") may have processing capabilities sufficient to carry out some but not all of the functions of a control smart device (i.e., monitoring, vector generating, analyzing, anonymizing transmitting). For example, observer devices may include televisions, entertainment systems, refrigerators, etc. These devices may be in regular communication with remote services, and may be configured to generate their own behavior information.

In various aspects, the limited devices 112, 114 may observe their own operations and functions, collecting such behavior information throughout a time period that may be continuous or predetermined. This behavior information may be transmitted to a control smart device 120, or if no device is within communicating distance, an observer device. The control smart device 120 or observer device 116, 118 may use the received behavior information by a vector generator module 122 that may use the behavior information to generate behavior vectors containing specific information about the reported device operations and functions. Similarly, observer devices 116, 118 may pass their own behavior information to control smart devices 120 or may generate appropriate behavior vectors prior to transmission.

In various aspects, generated behavior vectors are transmitted to the analyzer module 124. The analyzer module may lookup a stored classifier model associated with the device from which the behavior information was obtained. Alternatively, the analyzer module 124 may use a classifier model transmitted to it by the device from which the behavior was obtained. The behavior vector may be compared against the classifier model to detect the presence of anomalous behaviors. If no behaviors are found to be anomalous, no further action need be taken by the control smart device 120.

In various aspects, the detection of anomalous behavior by the analyzer module 124 may result in the flagging of the behavior vector, or a specific component of the behavior vector associated with the anonymous behavior. The type of anomalous behavior may further be classified as benign or malicious. In some aspects, this classification may involve the querying of a user to assess the malfunction and provide input on whether the user perceived an error. Anomalous behavior vectors may be anonymized and transmitted regardless of the classification as benign or malicious in order to provide accurate data about error and malfunction rates.

The behavior vector may be transmitted to the anonymizer module 126, which may remove any information that could be considered personal to a user or identifying of a device owner or user. In some aspects, each type of smart device may have an associated anonymization scheme to remove identifying or personal data from the behavior vector. An anonymizer classifier model may be used by the anonymizer module to determine what information within the behavior vector could be personal or identifying. For example, a television anonymizer classifier model might include components or entries indicating that a particular vector element relates to a machine address. By applying the anonymizer classifier model to the behavior vector, the anonymizer module 126 may easily and quickly identify information that should be removed before transmission. Once all identifying information is removed from the behavior vector it may be transmitted to a remote location for aggregation with other device information.

Figure 2:
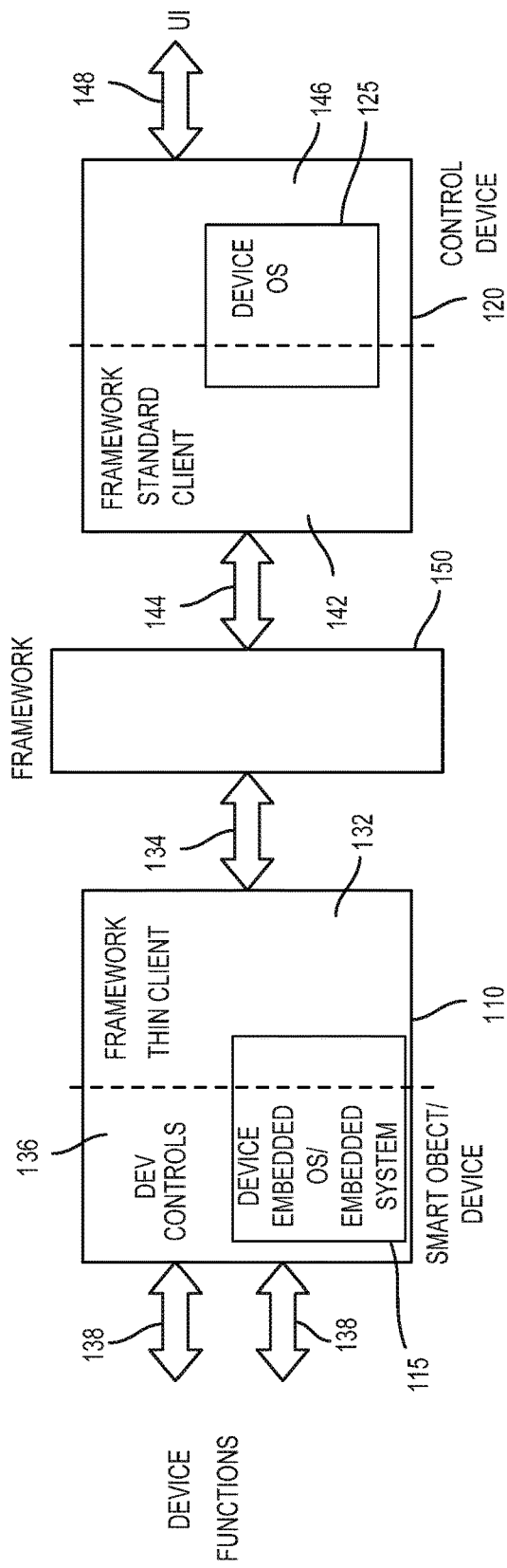
FIG. 2 is a block diagram illustrating components of a smart device networking framework suitable for use with the various aspects.

In the various aspects smart device configurations in a networking framework 150 may be implemented as illustrated in FIG. 2. The networking framework 150 may refer to the core aspects of the networking framework, such as the AllJoyn framework. The networking framework 150 provides client services to the control smart device 120 and the controlled smart device 110 and represents a distributed software bus architecture that enables the control smart device 120 to control the controlled smart device 110 through a framework connection 144 and 134, and a series of APIs, SDKs, and other software mechanisms. The framework connections 124 and 115 may be considered as parts of the distributed software bus. In one aspect, the networking framework 150 allows applications to interact through a series of universal high level software mechanisms.

Applications that are compatible with the networking framework 150 may be connected to the networking framework 150 (e.g., software bus). In an AllJoyn framework, for example, such applications may be referred to as a Bus Attachment. A Bus Attachment may be any type of application and may have a unique name. The unique name may be automatically assigned when a Bus Attachment is connected to the AllJoyn Bus (e.g., during Onboarding). The Bus Attachment may create Bus Devices, which may identify themselves to other Bus Devices using a process of Advertising to broadcast their existence. A Discovery process allows a Bus Device to determine the existence of other Bus Devices. A Bus Device may access services provided by other AllJoyn Bus Attachments.

In the various aspects, the control smart device 120 may be configured with a networking framework standard client 142 that provides direct or indirect access to the resources of the control smart device 120. Access for the networking framework standard client 142 may be provided through access to the control smart device operating system 125 and the hardware (and software) resources of the device platform 146 of the control smart device 120. The resources may include access to a processor, memory, and a user interface 148, which may include display resources and input resources (e.g., hard or soft keyboard, touchscreen, mouse, camera, microphone(s), accelerometer, etc.).

A smart device 110 that may be controlled, such as a smart bulb, a smart appliance, or other device configured as a limited smart device, typically has limited processing resources. In the various aspects, such a smart device 110 may be configured with a networking framework thin client 132, which provides direct or indirect access to the resources of the smart device 110. Access for the networking framework thin client 132 may be provided through access to the smart device embedded operating system or embedded system 115. In a situation where the smart device 110 has extensive processing resources, the smart device 110 may nevertheless be equipped with the networking framework thin client 132. The thin client 132 may be provided when the smart device 110 is primarily configured to be a controlled device. However, when the smart device 110 can also operate to control other smart devices, the smart device 110 may be configured as a control smart device 120 with the networking framework standard client 125. In aspects, the smart device 110 may not have sufficient resources to complete processing tasks. In such situations, processing requirements may be distributed to other clients, such as the networking framework standard client 125 on the control smart device 120, or to other smart devices such as observer devices 116, 118.

The networking framework thin client 132 on the smart device 110 may further have access to the functions or services 138 provided by the smart device 110. The functions 138 may be actions that can be controlled by the control smart device 120, such as dimming or turning on and off a smart bulb, starting a brewing cycle on a smart coffee makers, and so on. The function 138 may further include providing status indications or notifications to the control smart device 120, such as that the brewing cycle on the smart coffee maker is complete. Alternatively, or in addition, the smart device 110 may provide information about the capabilities of the smart device 110, such as its functions or services 118 that are available.

In the AllJoyn framework example, the AllJoyn Thin Client (AJTC) provides the distributed programming environment to the generally limited resources of a smart device 110 configured as an embedded system. Since the operating environment in which an AJTC operates may be very constrained, an AllJoyn component, such as a Bus Device must live within the system constraints. The AllJoyn Standard Client (AJSC) may be configured to take advantage of the features of high performance processors typically installed in control smart devices, such as multi-threading capabilities. However smart devices running the AJTC typically do not have such resources. Thus, an AllJoyn daemon, which typically accompanies the AJSC and requires multi-threading, handles many network connections, and uses relatively large amounts of memory may not be provided in the AJTC. Other enhanced aspects of the AJSC are also not available in the AJTC, such as the ability to run an device-oriented programming environment that includes alternate language bindings. Accordingly, the AJTC is configured as a Bus Attachment having data structures corresponding to interfaces, methods, signals, properties of the smart device. Bus Devices in the AJTC may be highly optimized for efficient use of memory space. Thus, the APIs in the AJTC are typically different from those provided in the AJSC. Although the APIs may be different in the AJTC, all of the major conceptual blocks of the AllJoyn framework that are found in AJSC can be found in AJTC systems in a compact form. In some instances, some Bus Devices may be configured to run remotely on another, more capable machine.

Figure 3:
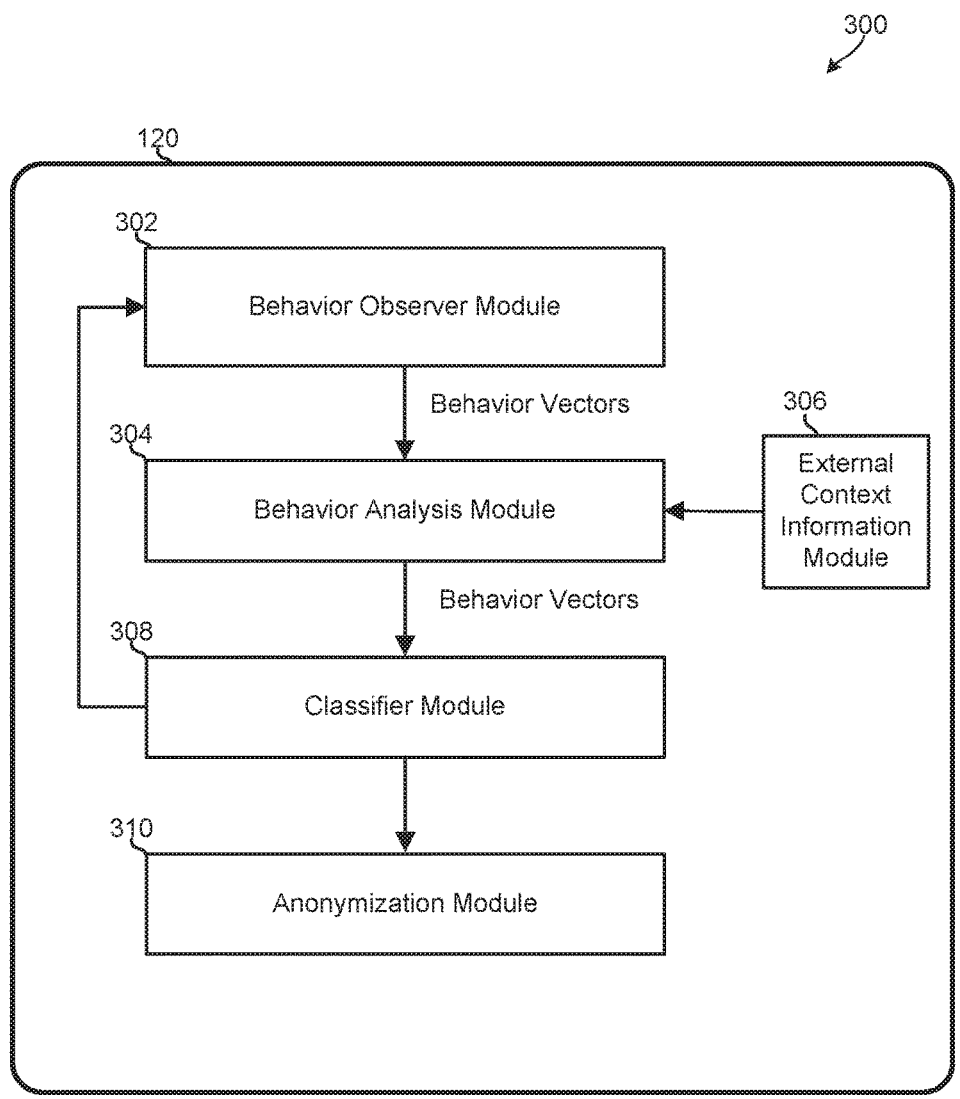
FIG. 3 is a block diagram illustrating example logical components and information flows in an aspect smart device configured to determine whether a particular smart device behavior is malicious, performance-degrading, suspicious, or benign.

FIG. 3 illustrates example logical components and information flows in an aspect smart device, such as a limited device 110, 112, an observer device 114, 116, and/or a control smart device 120, configured to perform real-time behavior monitoring and analysis operations 300 to determine whether a particular smart device behavior, software application, or process is anomalous, benign and/or malicious/performance-degrading, and further to anonymize information about the behavior and transmit it to a remote server. These operations 300 may be performed by one or more processing cores in the smart device 110, 112, 114, 116, 120 continuously (or near continuously) without consuming an excessive amount of the smart device's processing, memory, or energy resources. The example illustrated in FIG. 3 is described herein with reference to a control smart device 120, but is not intended to limit the scope of the specification and claims to the control smart device 120. Further examples herein describe components and functions of the example illustrated in FIG. 3 implement as part of and by a limited device 110, 112 and/or an observer device 114, 116.

In the example illustrated in FIG. 3, the smart device 120 includes a behavior observer module 302, a behavior analyzer module 304, an external context information module 306, a classifier module 308, and an anonymizer module 310. In an aspect, the classifier module 308 may be implemented as part of the behavior analyzer module 304. In an aspect, the behavior analyzer module 304 may be configured to generate one or more classifier modules 308, each of which may include one or more classifier models (e.g., data/behavior models) that include data and/or information structures (e.g., decision nodes, etc.) that may be used by a smart device processor to evaluate specific features of a software application or smart device behavior.

Each of the modules 302-310 may be a thread, process, daemon, module, sub-system, or component that is implemented in software, hardware, or a combination thereof. In various aspects, the modules 302-310 may be implemented within parts of the operating system (e.g., within the kernel, in the kernel space, in the user space, etc.), within separate programs or applications, in specialized hardware buffers or processors, or any combination thereof. In an aspect, one or more of the modules 302-310 may be implemented as software instructions executing on one or more processors of the control smart device 110, 112, 114, 116, 120.

The behavior observer module 302 may be configured to instrument or coordinate various APIs, registers, counters or other components (herein collectively "instrumented components") at various levels of the smart device system, and continuously (or near continuously) monitor smart device behaviors over a period of time and in real-time by collecting behavior information from the instrumented components as well as those of other. For example, the behavior observer module 302 may monitor library API calls, system call APIs, driver API calls, and other instrumented components by reading information from log files (e.g., API logs, etc.) stored in a memory of the smart device 110, 112, 114, 116, 120.

The behavior observer module 302 may also be configured to monitor/observe smart device operations and events (e.g., system events, state changes, etc.) via the instrumented components, collect information pertaining to the observed operations/events, intelligently filter the collected information, generate one or more observations (e.g., behavior vectors, etc.) based on the filtered information, and store the generated observations in a memory (e.g., in a log file, etc.) and/or send (e.g., via memory writes, function calls, etc.) the generated observations or collected behavior information from the local device or from other smart devices such as limited devices and observer devices, to the behavior analyzer module 304. In various aspects, the generated observations may be stored as a behavior vector and/or in an API log file or structure.

The behavior observer module 302 may monitor/observe smart device operations and events by collecting information pertaining to library API calls in an application framework or run-time libraries, system call APIs, file-system, and networking sub-system operations, device (including sensor devices) state changes, and other similar events. The behavior observer module 302 may also monitor file system activity, which may include searching for filenames, categories of file accesses (personal info or normal data files), creating or deleting files (e.g., type exe, zip, etc.), file read/write/seek operations, changing file permissions, etc. For limited devices and observer devices, observed application information may be minimal.

The behavior observer module 302 may also monitor data network activity, which may include types of connections, protocols, port numbers, server/client that the device is connected to, the number of connections, volume or frequency of communications, etc. The behavior observer module 302 may monitor phone network activity, which may include monitoring the type and number of calls or messages (e.g., SMS, etc.) sent out, received, or intercepted (e.g., the number of premium calls placed).

The behavior observer module 302 may also monitor the system resource usage, which may include monitoring the number of forks, memory access operations, number of files open, etc. The behavior observer module 302 may monitor the state of the smart device, which may include monitoring various factors, such as whether the display is on or off, whether the device is locked or unlocked, the amount of battery remaining, the state of a camera, etc.

The behavior observer module 302 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the smart computing device.

The behavior observer module 302 may also monitor/observe one or more hardware counters that denote the state or status of the smart computing device and/or smart device sub-systems. A hardware counter may include a special-purpose register of the processors/cores that is configured to store a count or state of hardware-related activities or events occurring in the smart computing device. For example, the observer module 302 may monitor or observe thermal spikes, power surges, component failure and other hardware related errors.

The behavior observer module 302 may also monitor/observe actions or operations of software applications, software downloads from an application download server (e.g., Apple® App Store server), smart device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth®, WiFi, etc.), content of text-based communications, content of recorded audio files, phonebook or contact information, contacts lists, etc.

The behavior observer module 302 may monitor/observe transmissions or communications of the smart device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 302 may monitor/observe usage of and updates/changes to compass information, smart device settings, battery life, gyroscope information, pressure sensors, magnet sensors, screen activity, etc. The behavior observer module 302 may monitor/observe notifications communicated to and from a software application (AppNotifications), application updates, etc. The behavior observer module 302 may monitor/observe conditions or events pertaining to a first software application requesting the downloading and/or install of a second software application. The behavior observer module 302 may monitor/observe conditions or events pertaining to user verification, such as the entry of a password, etc.

The behavior observer module 302 may also monitor/observe conditions or events at multiple levels of the smart device, including the application level, radio level, and sensor level. Application level observations may include observing the user via facial recognition software, observing social streams, observing notes entered by the user, observing events pertaining to the use of financial applications such as PassBook, Google® wallet, and Paypal, observing a software application's access and use of protected information, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc. The application level observation may also include monitoring a software application's use of biometric sensors (e.g., fingerprint reader, voice recognition subsystem, retina scanner, etc.) to authorize financial transactions, and conditions relating to the access and use of the biometric sensors.

Radio level observations may include determining the presence, existence or amount of any or more of: user interaction with the smart device before establishing radio communication links or transmitting information, dual/multiple subscriber identity module (SIM) cards, Internet radio, smart phone tethering, offloading data for computations, device state communications, the use as a game controller or home controller, vehicle communications, smart device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Other examples of sensor level observations related to usage or external environments may include, detecting near-field communications (NFC), collecting information from a credit card scanner, barcode scanner, or smart tag reader, detecting the presence of a universal serial bus (USB) power charging source, detecting that a keyboard or auxiliary device has been coupled to the smart device, detecting that the smart device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the smart device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the smart device, collecting information from a fingerprint reader, voice recognition subsystem, retina scanner, etc.

The behavior observer module 302 may be configured to generate behavior vectors that include a concise definition of the observed behaviors. Each behavior vector may succinctly describe observed behavior of the smart device, software application, or process in a value or vector datastructure (e.g., in the form of a string of numbers, etc.). A behavior vector may also function as an identifier that enables the smart device system to quickly recognize, identify, and/or analyze smart device behaviors. In an aspect, the behavior observer module 302 may generate a behavior vector that includes a series of numbers, each of which signifies a feature or a behavior of the smart device. For example, numbers included in the behavior vector may signify whether a camera of the smart device is in use (e.g., as zero when the camera is off and one when the camera is activated), an amount of network traffic that has been transmitted from or generated by the smart device (e.g., 20 KB/sec, etc.), a number of Internet messages that have been communicated (e.g., number of SMS messages, etc.), and so forth.

There may be a large variety of factors that may contribute to device malfunctions, execution errors, and degradation in performance and power utilization levels of the smart device over time, including poorly designed software applications, malware, viruses, fragmented memory, and background processes. Due to the number, variety, and complexity of these factors, it is often not feasible to simultaneously evaluate all of the various components, behaviors, processes, operations, conditions, states, or features (or combinations thereof) that may degrade performance and/or power utilization levels of the complex yet resource-constrained systems of modern smart devices. To reduce the number of factors monitored to a manageable level, in an aspect, the behavior observer module 302 may be configured to monitor/observe an initial or reduced set of behaviors or factors that are a small subset of all factors that could contribute to the smart device's degradation.

In an aspect, the behavior observer module 302 may receive the initial set of behaviors and/or factors in the form of a classifier model, from a network server 140 and/or a component in a cloud service or network. In an aspect, the initial set of behaviors/factors may be specified in a full classifier model received from the network server 140. In an aspect, the initial set of behaviors/factors may be specified in an device-specific classifier model that is generated in the smart device based on the behaviors and factors provided by the network server.

The behavior observer module 302 may communicate (e.g., via a memory write operation, function call, etc.) collected behavior information to the behavior analyzer module 304. The behavior analyzer module 304 may receive and use the behavior information to generate behavior vectors, generate spatial and/or temporal correlations based on the behavior vectors, and use this information to determine whether a particular smart device behavior, condition, sub-system, software application, or process is benign, suspicious, or not benign (i.e., malicious or performance-degrading).

The behavior analyzer module 304 and/or the classifier module 308 may be configured to perform real-time behavior analysis operations, which may include performing, executing, and/or applying data, algorithms, classifiers, or models (collectively referred to as "classifier models") to the collected behavior information to determine whether a smart device behavior is anomalous, and classify anomalous behavior as benign or not benign (e.g., malicious or performance-degrading). Each classifier model may be a behavior model that includes data and/or information structures (e.g., feature vectors, behavior vectors, component lists, etc.) that may be used by a smart device processor to evaluate a specific feature or aspect of a smart device behavior. Each smart device may have an associated device-specific classifier model, which may be stored on the smart device (e.g., for control devices and observer devices) or may be stored on a control device for reference in analyzing behaviors of other devices (e.g., limited devices, observer devices). Each classifier model may also include decision criteria for monitoring (i.e., via the behavior observer module 302) a number of features, factors, data points, entries, APIs, states, conditions, behaviors, applications, processes, operations, components, etc. (collectively referred to as "features") in the smart device 110, 112, 114, 116, 120. Classifier models may be preinstalled on the control smart device 120, downloaded or received from the network server 140, generated in the control smart device 120, or any combination thereof. The classifier models may also be generated by using crowd sourcing solutions, behavior modeling techniques, machine learning algorithms, etc.

The behavior analyzer module 304 and/or classifier module 308 may receive the observations or behavior information from the behavior observer module 302, or may receive the observations from other smart devices, such as observer devices that have generated their own behavior vectors prior to transmission to the control smart device 120, compare the received information (i.e., observations) with contextual information received from the external context information module 306, and identify subsystems, processes, and/or applications associated with the received observations that are anomalous, or otherwise inconsistent with normal device operations.

In an aspect, the behavior analyzer module 304 and/or classifier module 308 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 304 may be configured to analyze information (e.g., in the form of observations) collected from various modules (e.g., the behavior observer module 302, external context information module 306, etc.), learn the normal operational behaviors of the smart device, and generate one or more behavior vectors based the results of the comparisons. The behavior analyzer module 304 may send the generated behavior vectors to the classifier module 308 for further analysis.

In an aspect, the classifier module 308 may be configured to apply or compare behavior vectors to a classifier model to determine whether a particular smart device behavior, software application, or process, recognized by the analyzer module 304 as anomalous, is performance-degrading/malicious or benign. When the classifier module 308 determines that a behavior, software application, or process is malicious or performance-degrading, the classifier module 308 may notify the anonymizer module 310, which may perform various actions or operations to anonymize behavior vectors determined to contain anomalous behavior, and perform operations to transmit the anonymized behavior vector information.

When the classifier module 308 determines that a behavior, software application, or process is suspicious, the classifier module 308 may notify the behavior observer module 302, which may adjust the granularity of its observations (i.e., the level of detail at which smart device behaviors are observed) and/or change the behaviors that are observed based on information received from the classifier module 308 (e.g., results of the real-time analysis operations), generate or collect new or additional behavior information, and send the new/additional information to the behavior analyzer module 304 and/or classifier module 308 for further analysis/classification. Such feedback communications between the behavior observer module 302 and the classifier module 308 enable the control smart device 120 to recursively increase the granularity of the observations (i.e., make finer or more detailed observations) or change the features/behaviors that are observed until a source of a suspicious or performance-degrading smart device behavior is identified, until a processing or battery consumption threshold is reached, or until the smart device processor determines that the source of the suspicious or performance-degrading smart device behavior cannot be identified from further increases in observation granularity. Such feedback communication also enable the smart device 110, 112, 114, 116, 120 to adjust or modify the data/behavior models locally in the smart device without consuming an excessive amount of the smart device's processing, memory, or energy resources.

In an aspect, the anonymizer module 310 may be configured to receive a behavior vector determined to contain anomalous behavior instances, along with a classification of the anomalous behaviors as either benign or malicious. Some aspects may include behavior vectors transmitted by related modules of the smart control device 120 (e.g., analyzer module 304 and/or classifier module 308). Other aspects may include behavior information transmitted from an observer device, in which the behavior vector was generated and analyzed on the observer device, but transmitted to a control smart device 120 for anonymization.

The anonymizer module 310 may be configured to perform behavior vector anonymization operations, which may include performing, executing, and/or applying data, algorithms, classifiers, or models (collectively referred to as "anonymizer classifier models") to the identified behavior vectors to remove any device information that might be personal to users or user-identifying (e.g. machine addresses, user data, location data, etc.). Each anonymizer classifier model may be a behavior model like the standard classifier model and include data and/or information structures (e.g., feature vectors, behavior vectors, component lists, etc.) that may be used by a smart device processor to evaluate a which specific features or aspects of a smart device behavior could be personal or user-identifying. Each smart device may have an associated device-specific anonymizer classifier model, which may be stored on the smart device (e.g., for control devices and observer devices) or may be stored on a control device for reference in anonymizing behavior vectors associated with other devices (e.g., limited devices, observer devices). Anonymizer classifier models may be preinstalled on the control smart device 120, downloaded or received from the network server 140, generated in the control smart device 120, or any combination thereof. The models may be updated as smart device features are modified or updated. Once the personal or user-identifying information is removed from the behavior vector and appended classification information, the anonymized behavior vector may be transmitted over the network to a network server 140.

In an aspect, behaviors identified by the analyzer module 304 as anomalous may be determined to require additional observation. Some aspects may include requests transmitted from the network server 140 to observer a particular feature. To focus behavior observations on particular features of specific devices, the smart device (e.g., control smart device) may generate feature-targeting classifier models, which may be used in addition to or in lieu of standard classifier models.

The behavior observer module 302 and the behavior analyzer module 304 may provide, either individually or collectively, real-time behavior analysis of the smart device's behaviors to identify suspicious behavior from limited and coarse observations, to dynamically determine behaviors to observe in greater detail, and to dynamically determine the level of detail required for the observations. In this manner, the behavior observer module 302 may enable the control smart device 120 to efficiently identify problems from occurring on smart devices without requiring a large amount of processor, memory, or battery resources on the device.

In various aspects, the behavior observer module 302 and/or the behavior analyzer module 304 may be configured to use device-specific information of the one or more smart devices to identify smart device-specific plurality of test conditions, such as previously observed anomalous behaviors. These test conditions may be used to generate feature-targeting classifier models that may be used to more closely monitor observed behaviors that are relevant to the one or more smart devices. In an aspect, the feature-targeting classifier model may be generated to include or prioritize decision nodes that evaluate a smart device feature that is relevant to a past anomaly, recently updated or modified feature, current operating state or configuration of the smart device. In a further aspect, generating the lean classifier model may include determining a number of unique test conditions that should be evaluated to classify the behavior without consuming an excessive amount of smart device's resources (e.g., processing, memory, or energy resources), generating a list of test conditions by sequentially traversing the plurality of test conditions in the standard classifier model, inserting those test conditions that are relevant to classifying the target behavior of the smart device into the list of test conditions until the list of test conditions includes the determined number of unique test conditions, and generating the feature-targeting classifier model to include decision nodes included in the standard classifier model that test one of the conditions included in the generated list of test conditions. The feature-targeting classifier model may be stored for use in subsequent analyses or may be transmitted back to a smart device (e.g., an observer device) for storage.

Various aspects include methods and systems that facilitate distribution of smart device behavior observation, analysis, and anonymization across smart devices of varied processing capabilities. For example, a single control smart device 120 may observe its own behavior, analyze that behavior, anonymize behavior information, and transmit the information. As another example, a limited device 110, 112, such as a toaster, may monitor its normal operations, transmit a log of the observed behaviors to the control smart device 120 for analysis and anonymization, or if no control smart device 120 is in range, the log of observed behaviors may be transmitted to an observer device 116, 118. Observer devices 116, 118 may transmit their own observed behaviors in addition to the received limited device 110, 112 log of behaviors. Similarly, the observer devices 116, 118 may generate behavior vectors for their own behaviors and the limited device behaviors, transmitting only behavior vectors to the control smart device 120.

In some aspects, to reduce inter-device transmissions, observer devices 116, 118 may perform behavior vector generation and analysis for their own observed behaviors as well as the observed behaviors of nearby limited devices 110, 112. In such aspects, the behavior vectors may only be transmitted to the control smart device 120 if an anomaly is detected. Thus, the processing load on the control smart device 120 may be reduced by distributing some generation and analysis tasks to those observer devices 116, 118 with substantial processing capabilities and low processing loads during downtime (e.g., televisions, refrigerators, radios, entertainment systems, etc.). In various configurations and aspects, behavior information may only be transmitted locally amongst the smart device network and may not be transmitted over any open communications network, such as the Internet, without first being anonymized to remove personal information.

Figure 4:
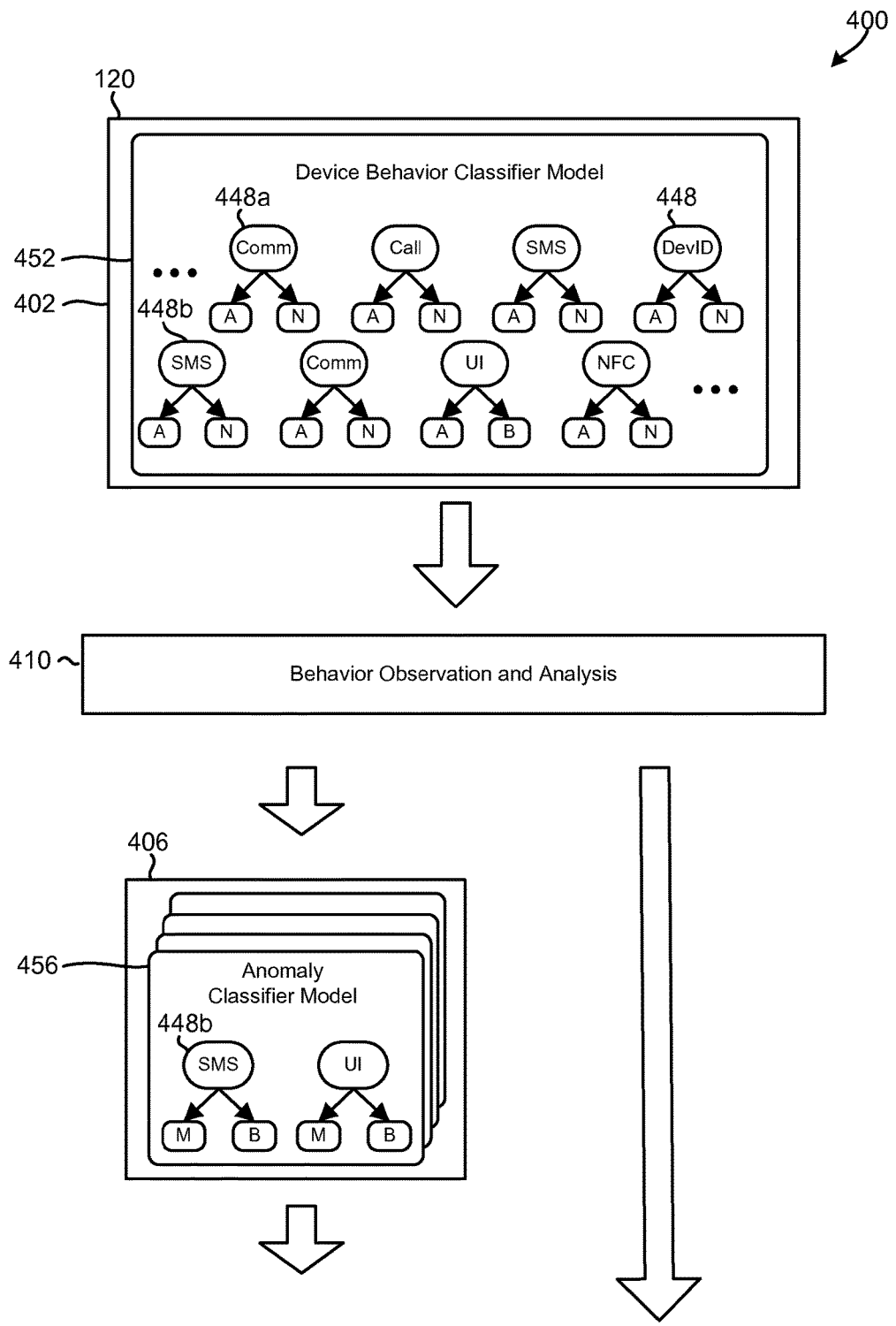
FIG. 4 is a block diagram illustrating example components and information flows in an aspect system that includes a smart device configured to generate an application-based classifier models without re-training the data, behavior vectors, or classifier models.

FIG. 4 illustrates an aspect method 400 of generating device-specific classifier models in a control smart device 120. Method 400 may be performed by a processing core of a control smart device 120.

In block 402, the processing core may use information included in a classifier model 452 to generate a large number of decision nodes 448 that collectively identify, describe, test, or evaluate all or many of the features and data points that are relevant to determining whether an observed smart device behavior is benign or contributing to the degradation in performance or power consumption characteristics of the smart device 120 over time. For example, in block 402, the processing core may generate one-hundred (100) decision nodes 448 that test forty (40) unique conditions.

In an aspect, the decision nodes 448 may be decision stumps. Each decision stump may be a one level decision tree that has exactly one node that tests one condition or smart device feature. Because there is only one node in a decision stump, applying a feature vector to a decision stump results in a binary answer (e.g., yes or no, malicious or benign, etc.). For example, if the condition tested by a decision stump 448b is "is the frequency of SMS transmissions less than x per min," applying a value of "3" to the decision stump 448b will result in either a "yes" answer (for "less than 3" SMS transmissions) or a "no" answer (for "3 or more" SMS transmissions). This binary "yes" or "no" answer may then be used to classify the result as indicating that the behavior is either anomalous (A) or normal (N). Since these stumps are very simple evaluations (basically binary), the processing to perform each stump is very simple and can be accomplished quickly and/or in parallel with less processing overhead.

In an aspect, each decision node 448 may be associated a weight value that may be based on or reflective of how much knowledge is gained from answering the test question and/or the likelihood that answering the test condition will enable the processing core to determine whether a smart device behavior is anomalous. The weight associated with a decision node 448 may be computed based on information collected from previous observations or analysis of smart device behaviors, software applications, or processes in the smart device. In an aspect, the weight associated with each decision node 448 may also be computed based on how many units of the corpus of data (e.g., cloud corpus of data or behavior vectors) are used to build the node. In an aspect, the weight values may be generated based on the accuracy or performance information collected from the execution/application of previous data/behavior models or classifiers.

In block 410, the processing core may use one or any combination of the classifier models 452 to perform real-time behavior monitoring and analysis operations, and predict whether an observed smart device behavior or part of routine device operations. In an aspect, the smart device may be configured use or apply multiple classifier models 452, such as a standard classifier model and feature-targeting classifier models, in parallel. In an aspect, the processing core may give preference or priority to the results generated from applying or using feature-targeting classifier models over the results generated from applying/using the standard classifier model 452 when evaluating a specific smart device behavior. The processing core may use the results of applying the classifier models to predict whether a smart device behavior is normal (e.g., associated with routine operation and function of the device) or anomalous.

In block 406, another classifier model may be applied to any decision stubs resulting in anomalous behavior. Each decision tree may include a binary option to determine whether an anomalous behavior is classified as "benign" or "malicious." Some anomalous behaviors may have no deleterious effect on the affected smart device, while other anomalies may be device malfunctions posing serious risk to the device's operational integrity or user safety. Results of the anomalous behavior classification may be appended to behavior vectors prior to, during, or after anonymization to provide a remote receiving entity with information about the nature of a detected anomaly.

Figure 5:
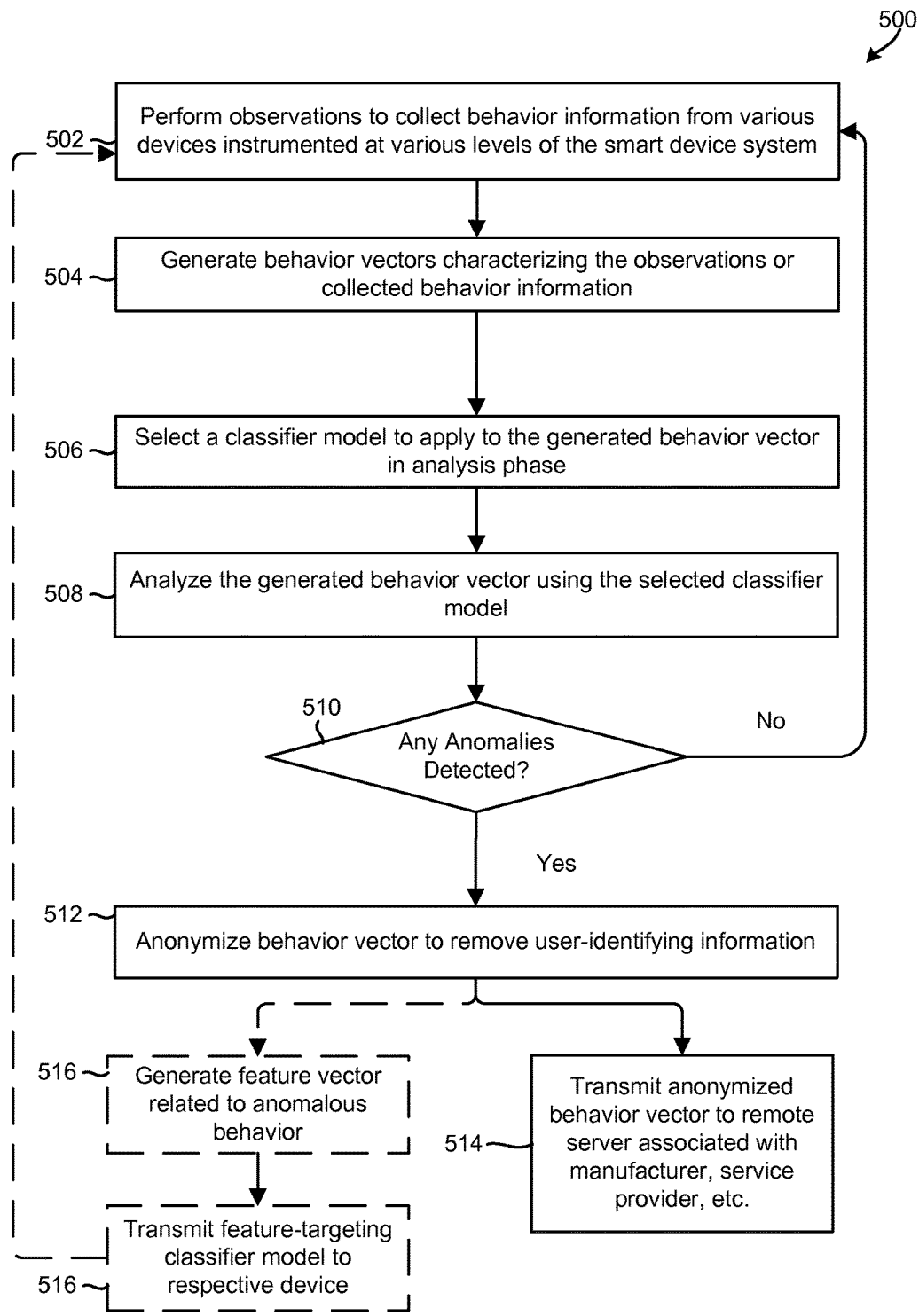
FIG. 5 is a process flow diagram illustrating another aspect smart device method of analyzing and anonymizing device-specific behaviors in a local network of smart devices.

FIG. 5 illustrates an example method 500 for performing anonymous crowd-sourcing of smart device behaviors in accordance with an aspect. In block 502, the smart device processor may perform coarse observations by monitoring/observing a subset of a large number factors/behaviors related to the smart device's operation and function. In block 504, the smart device processor may generate a behavior vector characterizing the coarse observations and/or the smart device behavior based on the coarse observations. In block 506, the smart device processor may identify one or more classifier models associated with the respective smart device. For example, the processor may execute a lookup on a local storage or may determine that the appropriate classifier model(s) was transmitted from an observer device or other control smart device along with the behavior information. In an aspect, as part of blocks 504 and 506, the smart device processor may perform one or more of the operations discussed above with reference to FIGS. 2-4.

In block 508, the smart device processor may perform behavioral analysis operations based on the coarse observations. This may be accomplished by comparing the one or more classifier models associated with the respective mart device to the behavior vector events.

In determination block 510, the smart device processor may determine whether anomalous behaviors or potential problems can be identified based on the results of the behavioral analysis. When the smart device processor determines that the anomalous behaviors or potential problems can be identified based on the results of the behavioral analysis (i.e., determination block 510="Yes"), the processor may initiate a process to anonymize the behavior vector and any classifying information in block 512 in order to remove any information related to user-identity, location, etc. In block 514, the anonymized behavior vector and any appended classification information may be transmitted to a network server via a network such as the Internet.

In some aspects, the processor may determine that the anomalous behavior warrants prioritized monitoring. In block 516, the processor of the smart device may generate a feature-targeting classifier model prioritizing the anomalous behavior for further monitoring. In block 518, the feature-targeting classifier model may be stored locally or transmitted to an associated smart device. The processor may then continue coarse observations in block 502.

When the smart device processor determines that the anomalous behaviors or potential problems cannot be identified based on the results of the behavioral analysis (i.e., determination block 510="No"), the processor may perform additional coarse observations in block 502.

In an aspect, as part of the operations in blocks 502-518 of the method 500, the smart device processor may perform real-time behavior analysis of the system's behaviors to identify anomalous behaviors from limited and coarse observations, analyze observed behaviors for anomalous behaviors, anonymize the behavior information of any detected anomalous behaviors, and transmit the anonymized behaviors to a remote server for aggregation and further analysis. This enables the manufacturers, service providers, and study administrators to collect a large corpus of data about the operation and function of specific smart devices, without disclosing any information personal to users or user-identifying.

Figure 6:
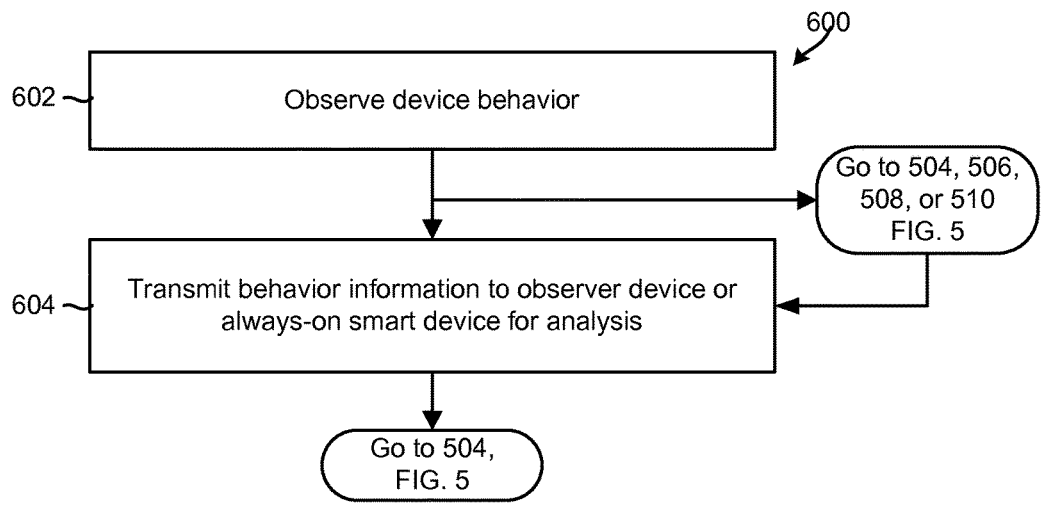
FIG. 6 is a process flow diagram illustrating another aspect smart device method of analyzing device behaviors in a limited capability smart device.

FIG. 6 illustrates an aspect method 600 of collecting and transmitting behavior observations of a limited or observer smart device. In block 602, a processor of a limited device, such as a smart household appliance, may monitor and observe device operations and functions. Observations may be made continuously or for predetermined intervals. In block 604, collected behavior logs may be transmitted to a control smart device or observer device. The processor core of the receiving smart device may generate a behavior vector in the manner discussed above with respect to operations in block 504. In some aspects, the transmitting device may be an observer device, which may perform any of the tasks associated with blocks 504-508 of method 500 prior to transmitting behavior information to the control smart device.

Figure 7:
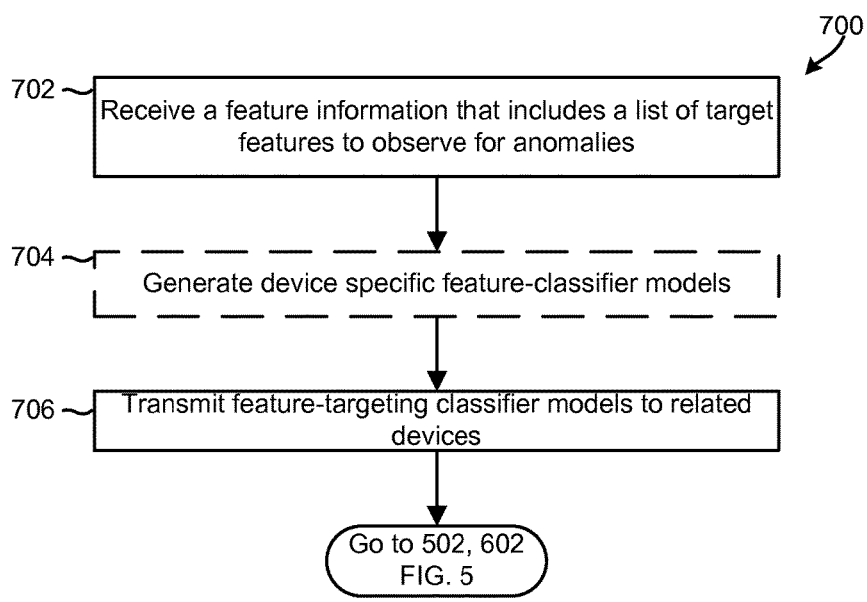
FIG. 7 is a process flow diagram illustrating another aspect smart device method of analyzing feature specific device behaviors in the smart device.

FIG. 7 illustrates an aspect method 700 of updating feature information or reprioritizing feature observation of a limited or observer smart device.

In block 702 of method 700, the processing core may receive a classifier model that is or includes an information structure that identifies a plurality of test conditions relating to one or more particular features of a specific smart device. In an aspect, the classifier model may include information suitable for expressing a plurality of decision stumps and/or which include information that is suitable for conversion by the smart device into a plurality of decision stumps. In an aspect, the feature information may include an ordered or prioritized list of decision stumps. Each of the decision stumps may include a test condition and a weight value. In an aspect, the feature information may be received by the control smart device or an observer device, and may be sent by a network server (e.g., a service provider, a manufacturer of the device, etc.). The feature information may contain updated weighting information to re-prioritize monitoring of a particular feature, new features to add to the list of behavior to monitor, and other such modifications to the existing classifier models and observation lists.

In block 704, the processing core may generate an updated feature-targeting classifier model. The feature-targeting classifier model may include the number of unique test conditions that should be evaluated to accurately classify a smart device behavior associated with the target feature as being either anomalous or normal without consuming an excessive amount of processing, memory, or energy resources of the smart device. The processing core may use device-specific or device-state-specific information to quickly identify the features and/or test conditions that should be included or excluded from the feature-targeting classifier models As another example, the processing core may identify and exclude from the feature-targeting classifier models the features/nodes/stumps that are included in the standard model and test conditions that cannot exist in the smart device and/or which are not relevant to the target feature of the smart device.

In block 706, the processor core may transmit the feature-targeting classifier model to all relevant smart devices in communication with the control smart device. For example, if the network server transmits updated information about safety of operational duration in smart light bulbs, the generated operation time feature-targeting classifier model may be transmitted to all control smart devices and observer devices for use in analyzing logged smart light bulb behavior. In some aspects, the feature-targeting classifier model may be transmitted to the smart light bulbs. The control smart device may also transmit updated behavior observation information to all smart light bulbs if the feature of "operational duration" was not previously being monitored. Observations of smart device behaviors may then commence block 502 of method 500 and/or block 602 of method 600 as discussed above.

Figure 8:
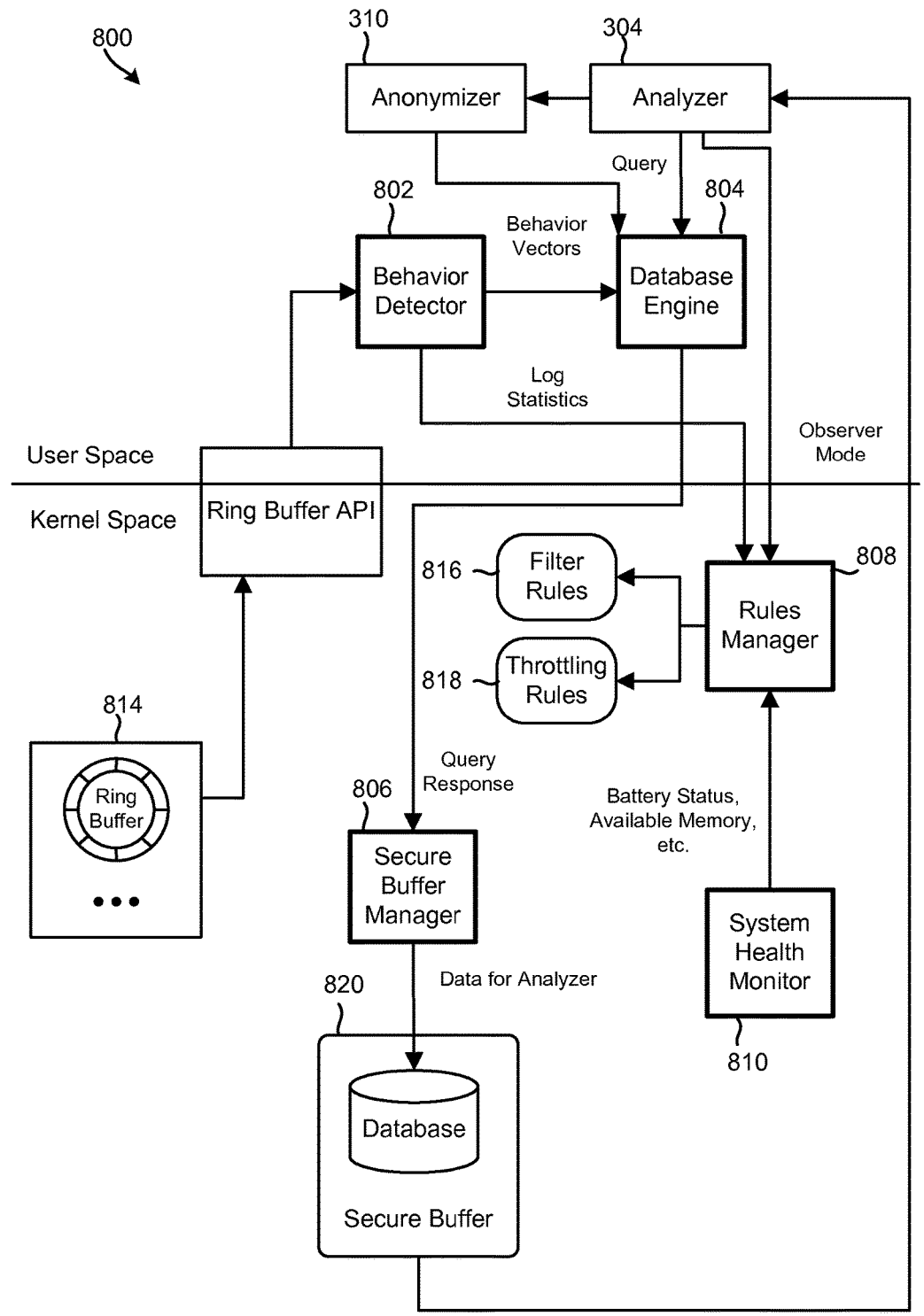
FIG. 8 is a block diagram illustrating logical components and information flows in a computing system implementing observer daemons in accordance with another aspect.

FIG. 8 illustrates in more detail logical components and information flows in a computing system 800 implementing an aspect observer daemon. In the example illustrated in FIG. 8, the computing system 800 includes a behavior detector 802 module, a database engine 804 module, and a behavior analyzer module 304 and anonymizer module 310 in the user space, and a ring buffer 814, a filter rules 816 module, a throttling rules 818 module, and a secure buffer 820 in the kernel space. The computing system 800 may further include an observer daemon that includes the behavior detector 802 and the database engine 804 in the user space, and the secure buffer manager 806, the rules manager 808, and the system health monitor 810 in the kernel space.

The various aspects may provide cross-layer observations on smart devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the smart device's malfunction or erroneous behavior, and it may not be feasible to monitor/observe all of the different factors that may contribute to the occurrence of anomalous behavior events. But, priority of feature observation may be dynamically modified throughout the lifecycle of the system, as desired by manufacturers, service providers, and other entities desiring information about the operation and function of specific feature of smart devices. Feature information may be transmitted to control smart devices for dissemination to other smart devices. In this manner, the anonymized behavior information being crowed-sourced, may be influenced by parties authorized to collect and analyze the data.

Figure 9:
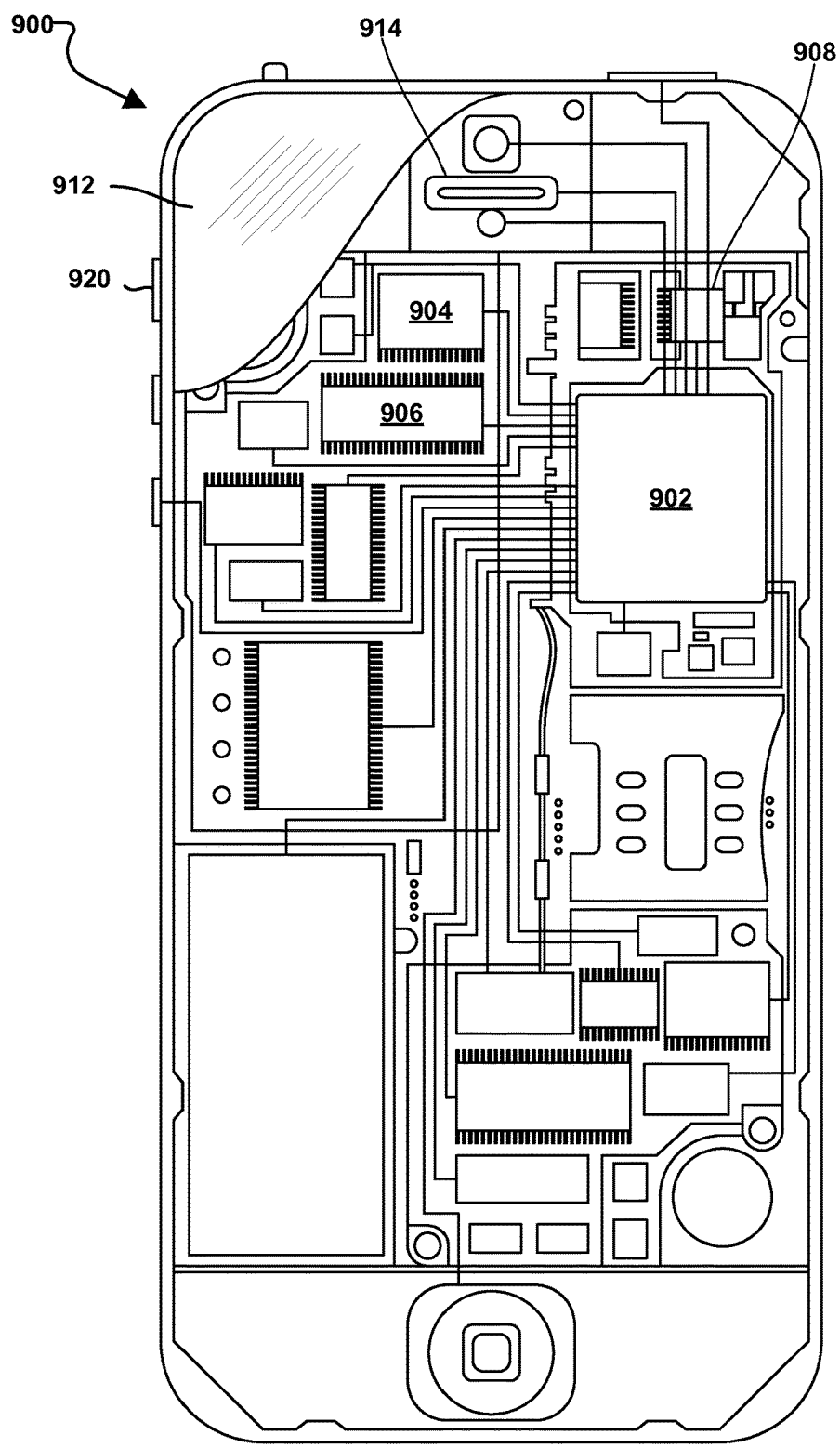
FIG. 9 is a component block diagram of a smart device suitable for use with various aspects.

The various aspects may be implemented on a variety of computing devices, an example of which is illustrated in FIG. 9 in the form of a smartphone. A smartphone 900 may include a processor 902 coupled to internal memory 904, a display 912, and to a speaker 914. Additionally, the smartphone 900 may include an antenna for sending and receiving electromagnetic radiation that may be connected to a wireless data link and/or cellular telephone transceiver 908 coupled to the processor 902. Smartphones 900 typically also include menu selection buttons or rocker switches 920 for receiving user inputs.

A typical smartphone 900 also includes a sound encoding/decoding (CODEC) circuit 906, which digitizes sound received from a microphone into data packets suitable for wireless transmission and decodes received sound data packets to generate analog signals that are provided to the speaker to generate sound. Also, one or more of the processor 902, wireless transceiver 908 and CODEC 1206 may include a digital signal processor (DSP) circuit (not shown separately).

Figure 10:
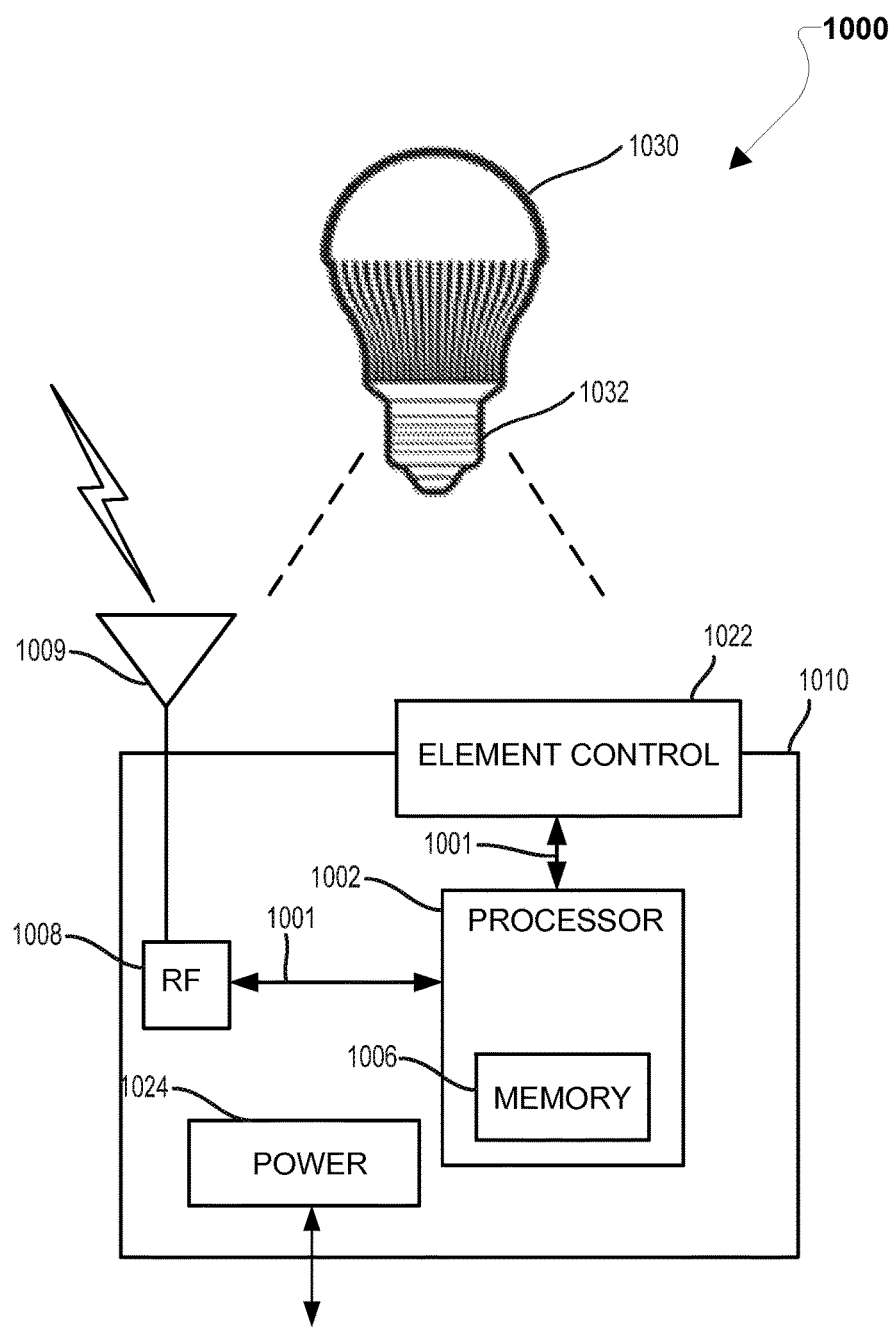
FIG. 10 is a component diagram of an example smart device in the form of a smart light bulb suitable for use with the various aspects.

Another example of a smart device suitable for use with the various aspects is a smart light bulb 1000 as illustrated in FIG. 10. A smart light bulb 1000 may include a base 1032 for inserting the smart light bulb 1000 into a socket or receptacle (not shown). The base 1032 may be any of a wide variety of bulb base types such as screw type bulb bases that are well known to those of skill in the art. The socket or receptacle typically provides a source of power, generally alternating current (AC) power by which the smart light bulb 1000 may obtain power to operate the active element 1039.

The smart light bulb 1000 may include a control unit 1010, which may include a processor 1002 and memory 1006, an RF unit 1008, an element control unit 1022, and a power unit 1024 coupled to the electrical connectors on the base 1032. The various units within the control unit 1010 may be coupled through connections 1001, and may be integrated as a system-on-chip (SOC). The processor 1002 may be an embedded processor or controller, a general purpose processor, or similar processor and may be equipped with memory 1006. The internal/external memory 1006 may be volatile or non-volatile memory. The control unit 1010 may have a radio signal transceiver 1008 (e.g., Bluetooth, Bluetooth LE, Zigbee, Wi-Fi, RF radio, etc.) coupled to the processor 1002 and an antenna 1009 for sending and receiving communications. The processor 1002 may be configured with processor executable instructions to perform some operations of various aspects, including monitoring behaviors, optionally generating a behavior vector, and transmitting behavior data and/or a behavior vector via the transceiver 1008.

Figure 11:
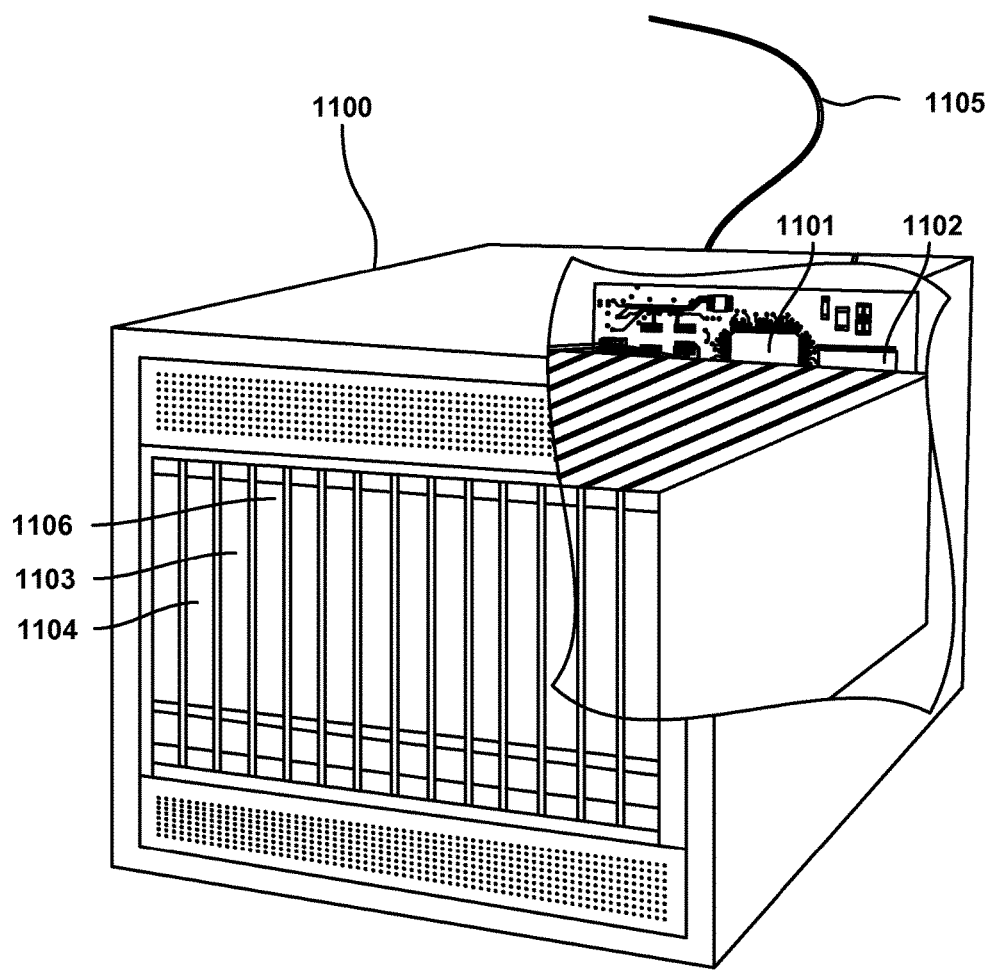
FIG. 11 is a component block diagram of a server device suitable for use with the various aspects.

Portions of the aspect methods may be accomplished in a client-server architecture with some of the processing occurring in a server, such as maintaining databases of normal operational behaviors, which may be accessed by a smart device processor while executing the aspect methods. Such aspects may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1304 coupled to the processor 1101. The server 1100 may also include network access ports 1106 coupled to the processor 1101 for establishing data connections with a network 1105, such as a local area network coupled to other broadcast system computers and servers.

The processors 902, 1002, 1101 may be any programmable microprocessor, microcomputer or multiple processor chip or chips that can be configured by software instructions (applications) to perform a variety of functions, including the functions of the various aspects described below. In some smart devices, multiple processors 902, 1002, 1101 may be provided, such as one processor dedicated to wireless communication functions and one processor dedicated to running other applications. Typically, software applications may be stored in the internal memory 904, 1006, 1102, 1103 before they are accessed and loaded into the processor 902, 1002, 1101. The processor 902, 1002, 1101 may include internal memory sufficient to store the application software instructions.

A number of different cellular and smart communication services and standards are available or contemplated in the future, all of which may implement and benefit from the various aspects. Such services and standards include, e.g., third generation partnership project (3GPP), long term evolution (LTE) systems, third generation wireless smart communication technology (3G), fourth generation wireless smart communication technology (4G), global system for smart communications (GSM), universal smart telecommunications system (UMTS), 3GSM, general packet radio service (GPRS), code division multiple access (CDMA) systems (e.g., cdmaOne, CDMA1020™), enhanced data rates for GSM evolution (EDGE), advanced smart phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "performance degradation" is used in this application to refer to a wide variety of undesirable smart device operations and characteristics, such as longer processing times, slower real time responsiveness, lower battery life, loss of private data, malicious economic activity (e.g., sending unauthorized premium SMS message), denial of service (DoS), operations relating to commandeering the smart device or utilizing the phone for spying or botnet activities, etc.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as device code) whose format is understandable by a processor.

Many smart computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an device, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of sharing device behavior information anonymously, comprising:
    obtaining, by a processor of a control smart device, a first anonymizer model based on a device type of a first device, wherein the first anonymizer model is configured to identify elements of a first device behavior vector of the first device, and wherein the identified elements include user-identifying information;
    monitoring, by the processor of the control smart device, the behavior of the first device over a period of time by collecting behavior information from device components;
    building, by the processor of the control smart device, the first device behavior vector using the collected behavior information of the first device;
    analyzing, by the processor of the control smart device, the first device behavior vector to detect anomalous behavior;
    anonymizing, by the processor of the control smart device, the first device behavior vector to remove user-identifying information to generate an anonymized first device behavior vector by applying to the first device behavior vector the first anonymizer model that is specific to the first device in response to detecting anomalous behavior; and
    transmitting, by a transceiver of the control smart device, the anonymized first device behavior vector over a network to a remote server.

2. The method of claim 1, wherein monitoring, by the processor of the control smart device, the behavior of the first device comprises receiving the collected behavior information from the first device; and
    the method further comprising:
        monitoring, by a processor of the first device, the behavior of the first device over a period of time by collecting the behavior information from the device components; and
        transmitting, by a transmitter of the first device, the collected behavior information to the control smart device.

3. The method of claim 1, further comprising:
    monitoring, by a processor of a second device, the behavior of the second device over a period of time by collecting behavior information from device components;
    transmitting, by a transmitter of the second device, the collected behavior information to a third device;
    building, by a processor of the third device, a second device behavior vector using the collected behavior information received from the second device;
    transmitting, by a transceiver of the third device, the second device behavior vector to the control smart device;
    analyzing, by the processor of the control smart device, the second device behavior vector to detect anomalous behavior; and
    anonymizing, by the processor of the control smart device, the second device behavior vector to remove user-identifying information to generate an anonymized second device behavior vector by applying to the second device behavior vector a second anonymizer model that is obtained based on a device type of the second device.

4. The method of claim 3, further comprising:
    monitoring, by the processor of the third device, behavior of the third device over a period of time by collecting behavior information from device components;
    building, by the processor of the third device, a third device behavior vector using the collected behavior information of the third device;
    transmitting, by the transceiver of the third device, the third device behavior vector to the control smart device;
    analyzing, by the processor of the control smart device, the third device behavior vector to detect anomalous behavior; and
    anonymizing, by the processor of the control smart device, the third device behavior vector to remove user-identifying information to generate an anonymized third device behavior vector by applying to the third device behavior vector a third anonymizer model that is obtained based on a device type of the third device, wherein the third anonymizer model differs from the first anonymizer model.

5. The method of claim 1, further comprising:
monitoring, by a processor of a second device, the behavior of the second device over a period of time by collecting behavior information from device components;
transmitting, by a transmitter of the second device, the collected behavior information to a third device;
building, by a processor of the third device, a second device behavior vector using the collected behavior information received from the second device;
analyzing, by the processor of the third device, the second device behavior vector to detect anomalous behavior;
transmitting, by a transceiver of the third device, the second device behavior vector to the control smart device in response to detecting anomalous behavior; and
anonymizing, by the processor of the control smart device, the second device behavior vector to remove user-identifying information to generate an anonymized second device behavior vector by applying to the second device behavior vector a second anonymizer model that is obtained based on a device type of the second device.

6. The method of claim 5, further comprising:
monitoring, by the processor of the third device, behavior of the third device over a period of time by collecting behavior information from device components;
building, by the processor of the third device, a third device behavior vector using the collected behavior information of the third device;
analyzing, by the processor of the third device, the third device behavior vector to detect anomalous behavior;
transmitting, by the transceiver of the third device, the third device behavior vector to the control smart device in response to detecting anomalous behavior; and
anonymizing, by the processor of the control smart device, the third device behavior vector to remove user-identifying information to generate an anonymized third device behavior vector by applying to the third device behavior vector a third anonymizer model that is obtained based on a device type of the third device, wherein the third anonymizer model differs from the first anonymizer model.

7. The method of claim 1, further comprising:
generating, by the processor of the control smart device, a feature vector in response to detecting anomalous behavior, wherein the feature vector is associated with a detected anomalous behavior;
transmitting, by the processor of the control smart device, the feature vector to one or more devices in local communication with the control smart device; and
monitoring, by processors of the one or more devices, behavior related to a feature contained in the feature vector.

8. The method of claim 1, further comprising:
receiving, by the transceiver of the control smart device, from a remote server, one or more feature vectors related to one or more devices in local communication with the control smart device;
transmitting, by the processor of the control smart device, the one or more feature vectors to the one or more devices in local communication with the control smart device; and
monitoring, by processors of the one or more devices, behavior related to a feature contained in the one or more feature vectors.

9. A control smart device comprising:
an antenna; and
a processor communicatively connected to the antenna and configured to:
  obtain a first anonymizer model based on a device type of a first device, wherein the first anonymizer model is configured to identify elements of a device behavior vector of the first device, and wherein the identified elements include user-identifying information;
  monitor the behavior of the first device over a period of time by collecting behavior information from device components;
  build the device behavior vector using the collected behavior information of the first device;
  analyze the device behavior vector to detect anomalous behavior;
  anonymize the device behavior vector to remove user-identifying information to generate an anonymized device behavior vector by applying to the device behavior vector the first anonymizer model that is specific to the first device in response to detecting anomalous behavior; and
  transmit the anonymized device behavior vector over a network to a remote server.

10. The control smart device of claim 9, wherein the processor is further configured to:
generate a feature vector in response to detecting anomalous behavior, wherein the feature vector is associated with a detected anomalous behavior;
transmit the feature vector to one or more devices in local communication with the control smart device; and
monitor behavior related to a feature contained in the feature vector.

11. The control smart device of claim 9, wherein the processor is further configured to:
receive from a remote server, one or more feature vectors related to one or more devices in local communication with the control smart device;
transmit the one or more feature vectors to the one or more devices in local communication with the control smart device; and
monitor behavior related to a feature contained in the one or more feature vectors.

12. A communications system, comprising:
a control smart device configured to receive and transmit data over a first local wireless network and a communications network;
a first device configured to receive and transmit data over a second local wireless network; and
a second device configured to transmit data over a third local wireless network;
wherein the control smart device comprises a control smart device processor configured to:
  obtain a first anonymizer model based on a device type of the first device, wherein the first anonymizer model is configured to identify elements of a first device behavior vector of the first device, wherein the identified elements include user-identifying information;
  monitor the behavior of the first device over a period of time by collecting behavior information from device components;
  build the first device behavior vector using the collected behavior information of the first device;

analyze the first device behavior vector to detect anomalous behavior;
anonymize the first device behavior vector to remove user-identifying information to generate an anonymized first device behavior vector by applying to the first device behavior vector the first anonymizer model that is specific to the first device in response to detecting anomalous behavior; and
transmit the anonymized first device behavior vector over the communications network to a remote server;
wherein the first device comprises a first processor configured with processor-executable instructions; and
wherein the second device comprises a second processor configured with processor-executable instructions.

13. The system of claim 12, wherein:
the control smart device processor of the control smart device is further configured with processor-executable instructions to monitor the behavior of the first device by receiving the collected behavior information from the first device; and
the first processor of the first device is further configured with processor-executable instructions to:
monitor the behavior of the first device over a period of time by collecting the behavior information from the device components; and
transmit the collected behavior information to the control smart device.

14. The system of claim 12, further the system further comprising a third device configured to transmit data over a fourth local wireless network, and wherein:
the second processor of the second device is further configured with processor-executable instructions to:
monitor the behavior of the second device over a period of time by collecting behavior information from device components; and
transmit the collected behavior information to the second device;
the third device comprises a third processor configured with processor-executable instructions to:
build a second device behavior vector using the collected behavior information received from the second device; and
transmit the second device behavior vector to the control smart device; and
the control smart device processor of the control smart device is further configured with processor-executable instructions to:
analyze the second device behavior vector to detect anomalous behavior; and
anonymize the second device behavior vector to remove user-identifying information to generate an anonymized second device behavior vector by applying to the second device behavior vector a second anonymizer model that is obtained based on a device type of the second device.

15. The system of claim 14, wherein:
the third processor of the third device is further configured with processor-executable instructions to:
monitor behavior of the third device over a period of time by collecting behavior information from device components;
build a third device behavior vector using the collected behavior information of the third device; and
transmit the third device behavior vector to the control smart device; and the control smart device processor of the control smart device is further configured with processor-executable instructions to:
analyze the third device behavior vector to detect anomalous behavior; and
anonymize the third device behavior vector to remove user-identifying information to generate an anonymized third device behavior vector by applying to the third device behavior vector a third anonymizer model that is obtained based on a device type of the third device, wherein the third anonymizer model differs from the first anonymizer model.

16. The system of claim 12, further the system further comprising a third device configured to transmit data over a fourth local wireless network, and wherein:
the second processor of the second device is further configured with processor-executable instructions to:
monitor the behavior of the second device over a period of time by collecting behavior information from device components;
transmit the collected behavior information to the third device; and
the third device comprises a third processor configured with processor-executable instructions to:
build a second device behavior vector using the collected behavior information received from the second device;
analyze the second device behavior vector to detect anomalous behavior; and
transmit the second device behavior vector to the control smart device in response to detecting anomalous behavior; and
the control smart device processor of the control smart device is further configured with processor-executable instructions to anonymize the second device behavior vector to remove user-identifying information to generate an anonymized second device behavior vector by applying to the second device behavior vector a second anonymizer model that is obtained based on a device type of the second device.

17. The system of claim 16, wherein the third processor of the third device is further configured with processor-executable instructions to:
monitor the behavior of the third device over a period of time by collecting behavior information from device components;
build a third device behavior vector using the collected behavior information of the third device;
analyze the third device behavior vector to detect anomalous behavior;
transmit the third device behavior vector to the control smart device in response to detecting anomalous behavior; and
the control smart device processor of the control smart device is further configured with processor-executable instructions to anonymize the third device behavior vector to remove user-identifying information to generate an anonymized third device behavior vector by applying to the third device behavior vector a third anonymizer model that is obtained based on a device type of the third device, wherein the third anonymizer model differs from the first anonymizer model.

18. The system of claim 12, wherein:
the control smart device processor of the control smart device is further configured with processor-executable instructions to:

generate a feature vector in response to detecting anomalous behavior, wherein the feature vector is associated with a detected anomalous behavior;

transmit the feature vector to one or more devices in local communication with the control smart device; and the control smart device processor, the first processor, and the second processor of the control smart device, the first device, and the second device, respectively, are further configured to:

monitor behavior related to a feature contained in the feature vector.

19. The system of claim 12, wherein:

the control smart device processor of the control smart device is further configured with processor-executable instructions to:

receive, from a remote server, one or more feature vectors related to one or more devices in local communication with the control smart device;

transmit the one or more feature vectors to the one or more devices in local communication with the control smart device; and the control smart device processor, the first processor, and the second processor of the control smart device, the first device, and the second device, respectively, are further configured to:

monitor behavior related to a feature contained in the one or more feature vectors.

20. A non-transitory processor-readable medium having stored thereon processor-executable software instructions to cause a processor of a control smart device to perform operations comprising:

obtaining an first anonymizer model based on a device type of a first device, wherein the first anonymizer model is configured to identify elements of a device behavior vector of the first device, and wherein the identified elements include user-identifying information;

monitoring the behavior of the first device over a period of time by collecting behavior information from device components;

building the device behavior vector using the collected behavior information of the first device; and analyzing the device behavior vector to detect anomalous behavior;

anonymizing the device behavior vector to remove user-identifying information to generate an anonymized device behavior vector by applying to the device behavior vector the first anonymizer model that is specific to the first device in response to detecting anomalous behavior; and transmitting the anonymized device behavior vector over a network to a remote server.

21. The non-transitory processor-readable medium of claim 20, wherein the stored processor-executable software instructions are configured to cause a processor of a control smart device to perform operations further comprising:

generating a feature vector in response to detecting anomalous behavior, wherein the feature vector is associated with a detected anomalous behavior;

transmitting the feature vector to one or more devices in local communication with the control smart device; and monitoring behavior related to a feature contained in the feature vector.

22. The non-transitory processor-readable medium of claim 20, wherein the stored processor-executable software instructions are configured to cause a processor of a control smart device to perform operations further comprising:

receiving, from a remote server, one or more feature vectors related to one or more devices in local communication with the control smart device;

transmitting the one or more feature vectors to the one or more devices in local communication with the control smart device; and monitoring behavior related to a feature contained in the one or more feature vectors.

23. A control smart device comprising:

means for obtaining a first anonymizer model based on a device type of a first device, wherein the first anonymizer model is configured to identify elements of a first device behavior vector of the first device, and wherein the identified elements include user-identifying information;

means for monitoring the behavior of the first device over a period of time by collecting behavior information from device components, means for building the first device behavior vector using the collected behavior information of the first device; and means for analyzing the first device behavior vector to detect anomalous behavior;

means for anonymizing the first device behavior vector to remove user-identifying information to generate an anonymized first device behavior vector by applying to the first device behavior vector the first anonymizer model that is specific to the first device in response to detecting anomalous behavior; and means for transmitting the anonymized first device behavior vector over a network to a remote server.

24. The control smart device of claim 23, further comprising:

means for generating a feature vector in response to detecting anomalous behavior, wherein the feature vector is associated with a detected anomalous behavior;

means for transmitting the feature vector to one or more devices in local communication with the control smart device; and means for monitoring behavior related to a feature contained in the feature vector.

25. The control smart device of claim 23, further comprising:

means for receiving, from a remote server, one or more feature vectors related to one or more devices in local communication with the control smart device;

means for transmitting the one or more feature vectors to the one or more devices in local communication with the control smart device; and means for monitoring behavior related to a feature contained in the one or more feature vectors.

* * * * *